United States Patent
Jang et al.

(10) Patent No.: US 12,407,470 B2
(45) Date of Patent: Sep. 2, 2025

(54) METHOD AND DEVICE FOR REPETITIVE TRANSMISSION/RECEPTION OF DOWNLINK CONTROL INFORMATION IN WIRELESS COMMUNICATION SYSTEM

(71) Applicant: Samsung Electronics Co., Ltd., Suwon-si (KR)

(72) Inventors: Youngrok Jang, Suwon-si (KR); Taehyoung Kim, Suwon-si (KR); Jinhyun Park, Suwon-si (KR); Jinyoung Oh, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 17/452,027

(22) Filed: Oct. 22, 2021

(65) Prior Publication Data

US 2022/0131672 A1 Apr. 28, 2022

(30) Foreign Application Priority Data

Oct. 23, 2020 (KR) ........................ 10-2020-0138299

(51) Int. Cl.
*H04W 4/00* (2018.01)
*H04L 5/00* (2006.01)
(Continued)

(52) U.S. Cl.
CPC ........... *H04L 5/0053* (2013.01); *H04W 72/23* (2023.01); *H04L 1/0038* (2013.01)

(58) Field of Classification Search
CPC ....... H04L 5/0053; H04L 1/1896; H04L 1/08; H04L 1/1845; H04L 1/1822;
(Continued)

(56) References Cited

U.S. PATENT DOCUMENTS

| 11,638,246 B2 * | 4/2023 | Hamidi-Sepehr ..... H04L 5/0053 |
| | | 370/329 |
| 11,647,525 B2 * | 5/2023 | Kim ...................... H04L 5/0094 |
| | | 370/329 |

(Continued)

FOREIGN PATENT DOCUMENTS

| EP | 3490184 A1 | 5/2019 |
| KR | 10-2020-0024344 A | 3/2020 |

(Continued)

OTHER PUBLICATIONS

International Search Report and Written Opinion of the International Searching Authority dated Jan. 20, 2022, in connection with International Application No. PCT/KR2021/014885, 7 pages.

(Continued)

*Primary Examiner* — Bob A Phunkulh

(57) ABSTRACT

A method and device for repetitive transmission/reception of downlink control information in a wireless communication system is disclosed, the method performed by a user equipment (UE) in the wireless communication system comprises transmitting, to a base station, first information related to physical downlink control channel (PDCCH) repetition transmission, the first information including second information associated with a number of blind decoding times of PDCCH candidates, receiving, from the base station, configuration information on a control resource set and a search space configured for PDCCH transmission, and receiving, from the base station, control information on a first PDCCH and a second PDCCH based on the first information and the configuration information, the second PDCCH being a repetition of the first PDCCH.

16 Claims, 20 Drawing Sheets

(51) Int. Cl.
*H04W 72/23* (2023.01)
*H04L 1/00* (2006.01)

(58) Field of Classification Search
CPC ..... H04L 1/1861; H04L 5/0094; H04L 5/001; H04L 5/0035; H04L 5/0048; H04L 1/0038; H04W 72/23
See application file for complete search history.

(56) References Cited

U.S. PATENT DOCUMENTS

| | | | |
|---|---|---|---|
| 12,082,010 B2* | 9/2024 | Lee | H04L 5/0053 |
| 12,177,756 B2* | 12/2024 | Park | H04W 4/70 |
| 2015/0208366 A1* | 7/2015 | Papasakellariou | H04W 52/367 370/311 |
| 2018/0084559 A1* | 3/2018 | Kim | H04B 7/26 |
| 2018/0198677 A1 | 7/2018 | Blankenship et al. | |
| 2019/0020506 A1* | 1/2019 | Cheng | H04L 1/007 |
| 2019/0089489 A1* | 3/2019 | Li | H04L 1/189 |
| 2019/0223191 A1* | 7/2019 | Kim | H04L 5/00 |
| 2019/0223197 A1* | 7/2019 | Shin | H04L 1/0031 |
| 2019/0230697 A1* | 7/2019 | Yang | H04L 1/1845 |
| 2020/0045696 A1* | 2/2020 | Huang | H04W 72/0446 |
| 2020/0145984 A1* | 5/2020 | Hosseini | H04L 5/0044 |
| 2020/0213837 A1* | 7/2020 | Pan | H04W 8/24 |
| 2020/0229104 A1* | 7/2020 | MolavianJazi | H04W 52/54 |
| 2020/0236699 A1* | 7/2020 | Nakashima | H04W 72/23 |
| 2020/0244507 A1* | 7/2020 | Pan | H04W 72/51 |
| 2020/0304230 A1* | 9/2020 | Papasakellariou | H04L 5/0094 |
| 2020/0305134 A1* | 9/2020 | Noh | H04L 5/0053 |
| 2020/0314678 A1* | 10/2020 | Lee | H04W 72/12 |
| 2020/0329389 A1* | 10/2020 | Hosseini | H04L 5/0053 |
| 2020/0351644 A1* | 11/2020 | Yang | H04W 24/02 |
| 2020/0413410 A1* | 12/2020 | Zhou | H04L 5/0053 |
| 2021/0029719 A1* | 1/2021 | Zhou | H04L 5/0055 |
| 2021/0029726 A1* | 1/2021 | Papasakellariou | H04L 5/0053 |
| 2021/0037607 A1* | 2/2021 | Hamidi-Sepehr | H04W 24/08 |
| 2021/0067268 A1* | 3/2021 | Seo | H04L 25/0238 |
| 2021/0168781 A1* | 6/2021 | Lee | H04W 72/23 |
| 2021/0320821 A1* | 10/2021 | Lee | H04W 74/0833 |
| 2021/0328725 A1* | 10/2021 | Jassal | H04L 1/1614 |
| 2021/0360667 A1* | 11/2021 | Moon | H04L 5/0051 |
| 2021/0385831 A1* | 12/2021 | Nogami | H04L 5/0094 |
| 2022/0046665 A1* | 2/2022 | Takeda | H04L 1/0003 |
| 2022/0110138 A1* | 4/2022 | Miao | H04L 5/0053 |
| 2022/0132341 A1* | 4/2022 | Lee | H04W 72/1263 |
| 2022/0173867 A1* | 6/2022 | Nogami | H04L 5/001 |
| 2022/0201515 A1* | 6/2022 | Chatterjee | H04L 5/0007 |
| 2022/0303799 A1* | 9/2022 | Yang | H04W 72/0446 |
| 2022/0304037 A1* | 9/2022 | Zhang | H04L 5/006 |
| 2022/0312239 A1* | 9/2022 | He | H04L 5/0053 |
| 2022/0329399 A1* | 10/2022 | Kittichokechai | H04L 5/0053 |
| 2022/0368498 A1* | 11/2022 | Sun | H04L 5/0053 |
| 2022/0377791 A1* | 11/2022 | Nogami | H04W 74/006 |
| 2022/0377808 A1* | 11/2022 | Park | H04L 5/0091 |
| 2023/0048526 A1* | 2/2023 | Harada | H04W 72/23 |
| 2023/0155794 A1* | 5/2023 | Yao | H04L 5/001 370/329 |
| 2023/0155873 A1* | 5/2023 | Yao | H04L 5/0091 370/329 |
| 2023/0156699 A1* | 5/2023 | Gao | H04W 72/1273 370/329 |
| 2023/0337253 A1* | 10/2023 | Zhou | H04L 5/0051 |
| 2024/0023101 A1* | 1/2024 | Gao | H04L 5/0023 |
| 2024/0064763 A1* | 2/2024 | Nunome | H04L 1/0046 |

FOREIGN PATENT DOCUMENTS

| | | |
|---|---|---|
| KR | 10-2020-0098087 A | 8/2020 |
| WO | 2022066900 A1 | 3/2022 |

OTHER PUBLICATIONS

Intel Corporation, "On PDCCH enhancements for eURLLC," R1-1904305, 3GPP TSG RAN WG1 #96bis, Xi'an, China, Apr. 8-12, 2019, 9 pages.

Interdigital Inc., "On Potential PDCCH Enhancements for URLLC," R1-1900803, 3GPP TSG RAN WG1 Ad-Hoc Meeting 1901, Taipei, Taiwan, Jan. 21-25, 2019, 10 pages.

Le, et al., "An overview of physical layer design for Ultra-Reliable Low-Latency Communications in 3GPP Release 15 and Release 16," arXiv:2002.03713v1 [eess.SP], Feb. 2020, 7 pages.

LG Electronics, "Discussion on PDCCH monitoring for reduced capability NR device," R1-2004022, 3GPP TSG RAN WG1 #101, eMeeting, May 25-Jun. 5, 2020, 3 pages.

Supplementary European Search Report dated Feb. 26, 2024, in connection with European Patent Application No. 21883323.4, 11 pages.

Qualcomm, "Summary #3 of [106bis-e-NR-feMIM0-02] Email discussion on multi-TRP for PDCCH," 3GPP TSG-RAN WG1 Meeting #106-bis-e R1-2110440, e-Meeting, Oct. 2021, 41 pages.

Communication pursuant to Article 94(3) EPC dated Jun. 3, 2025 in connection to European application No. 21883323.4, 6 pages.

* cited by examiner

METHOD AND DEVICE FOR REPETITIVE TRANSMISSION/RECEPTION OF DOWNLINK CONTROL INFORMATION IN WIRELESS COMMUNICATION SYSTEM

CROSS-REFERENCE TO RELATED APPLICATION

This application is based on and claims priority under 35 U.S.C. § 119 to Korean Patent Application No. 10-2020-0138299, filed on Oct. 23, 2020, in the Korean Intellectual Property Office, the disclosure of which is herein incorporated by reference in its entirety.

BACKGROUND

1. Field

The disclosure relates to a method and a device for transmitting or receiving downlink control information in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

With the advance of wireless communication systems as described above, various services can be provided and accordingly there is a need for schemes to efficiently provide these services.

SUMMARY

Disclosed embodiments are to provide a device and a method capable of efficiently providing a service in a wireless communication system.

Disclosed embodiments are to provide a device and a method for efficiently transmitting or receiving downlink control information in a wireless communication system.

Disclosed embodiments are to provide a device and a method for efficiently transmitting or receiving downlink control information repeatedly in a wireless communication system.

According to an embodiment of the disclosure, a method performed by a user equipment (UE) in a wireless communication system is provided, the method comprises transmitting, to a base station, first information related to a physical downlink control channel (PDCCH) repetition transmission, the first information including second information associated with a number of blind decoding times of PDCCH candidates, receiving, from the base station, configuration information on a control resource set and a search space configured for a PDCCH transmission, and receiving, from the base station, control information on a first PDCCH and a second PDCCH based on the first information and the configuration information, the second PDCCH being a repetition of the first PDCCH.

In addition, according to an embodiment of the disclosure, a UE in a wireless communication system is provided, the UE comprises a transceiver, and a processor configured to transmit, to a base station via the transceiver, first information related to a PDCCH repetition transmission, the first information including second information associated with a number of blind decoding times of PDCCH candidates, receive, via the transceiver from the base station, configuration information on a control resource set and a search space configured for PDCCH transmission, and receive, via the transceiver from the base station, control information on a first PDCCH and a second PDCCH based on the first information and the configuration information, the second PDCCH being a repetition of the first PDCCH.

In addition, according to an embodiment of the disclosure, a method performed by a base station in a wireless communication system is provided, the method comprises receiving, from a UE, first information related to a PDCCH repetition transmission, the first information including second information associated with a number of blind decoding times of PDCCH candidates, transmitting, to the UE, configuration information on a control resource set and a search space configured for a PDCCH transmission, and transmitting, to the UE, control information on a first PDCCH and a second PDCCH based on the information and the configuration information, the second PDCCH being a repetition of the first PDCCH.

In addition, according to an embodiment of the disclosure, a base station in a wireless communication system is provided, the base station comprises a transceiver, and a processor configured to receive, via the transceiver from a UE, first information related to a PDCCH repetition transmission, the first information including second information associated with a number of blind decoding times of PDCCH candidates, transmit, to the UE via the transceiver, configuration information on a control resource set and a search space configured for PDCCH transmission, and transmit, to the UE via the transceiver, control information on a first PDCCH and a second PDCCH based on the first information and the configuration information.

In addition, according to an embodiment of the disclosure, wherein the number of blind decoding times of PDCCH candidates correspond to a numbers of PDCCH candidate groups.

In addition, according to an embodiment of the disclosure, wherein the second information indicates that the number of blind decoding times of the PDCCH candidates is counted as two.

In addition, according to an embodiment of the disclosure, wherein the second information indicates that the number of blind decoding times of the PDCCH candidates is counted as three.

In addition, according to an embodiment of the disclosure, wherein the control information is repetitively received over different control resource sets or different search space sets within one control resource set.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
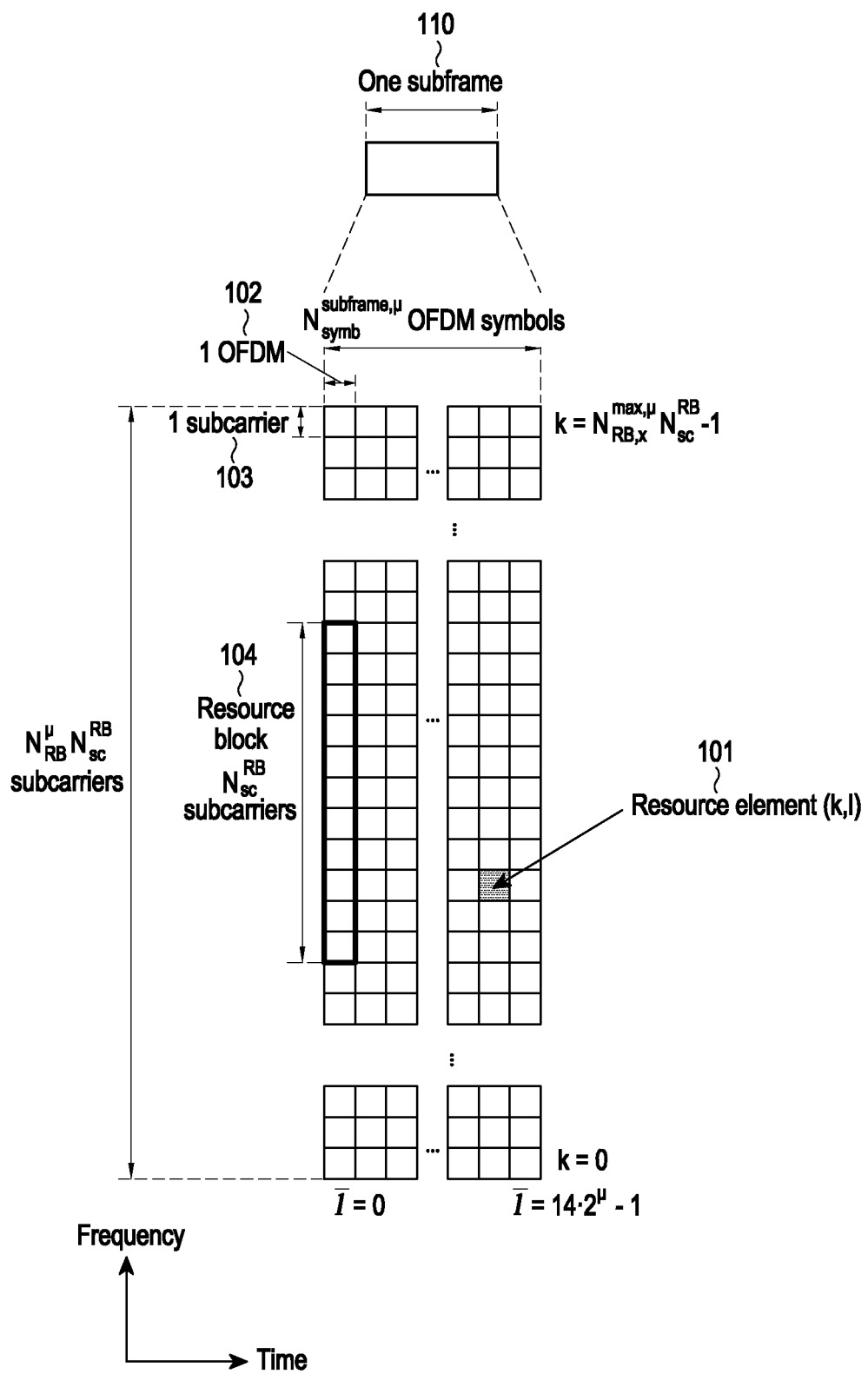
FIG. 1 is a diagram illustrating a basic structure of a time-frequency domain in a wireless communication system according to an embodiment of the disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Hereinafter, a base station is a subject that performs resource allocation to a user equipment (UE), and may be at least one of a gNode B, a gNB, an eNode B, an eNB, a Node B, a base station (BS), a radio access unit, a base station controller, or a node on a network. The base station may be a network entity, in an NR system, including at least one of an integrated access and backhaul (IAB)-donor that is a gNB which provides network access to a UE(s) via a network of backhaul and access links and an IAB-node that is a radio access network (RAN) node which supports NR access link(s) to a UE(s) and supports NR backhaul links to the IAB-donor or other IAB-nodes. A UE may be wirelessly connected via an IAB-node and may transmit or receive data to and from an IAB-donor connected to at least one IAB-node via a backhaul link.

A UE may include a terminal, a mobile station (MS), a cellular phone, a smartphone, a computer, or a multimedia system capable of performing communication functions. In the disclosure, a "downlink" refers to a radio link via which a base station transmits a signal to a UE, and an "uplink" refers to a radio link via which a UE transmits a signal to a base station. Further, although the following description may be directed to an LTE or LTE-A system by way of example, embodiments of the disclosure may also be applied to other communication systems having similar technical backgrounds or channel types to the embodiments of the disclosure. Examples of other communication systems may include 5th generation mobile communication technologies (5G, new radio, NR) developed beyond LTE-A, and in the following description, the "5G" may be a concept that covers exiting LTE, LTE-A, and other similar services. In addition, based on determinations by those skilled in the art, the disclosure may be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Wireless communication systems have been developed from an initial wireless communication system providing a voice-oriented service to a broadband wireless communication system providing a high-speed and high-quality packet data service, such as those according to communication standards including a high-speed packet access (HSPA) of 3GPP, long-term evolution (LTE) (or evolved universal terrestrial radio access (E-UTRA)), LTE-advanced (LTE-A), LTE-Pro, high rate packet data (HRPD) of 3GPP2, ultra-mobile broadband (UMB), and 802.16e of IEEE.

In an LTE system, which is a representative example of the broadband wireless communication system, a downlink (DL) adopts an orthogonal frequency division multiplexing (OFDM) scheme and an uplink (UL) adopts a single carrier frequency division multiple access (SC-FDMA) scheme. The uplink refers to a radio link via which a UE transmits data or a control signal to a base station (BS) (or eNode B), and the downlink refers to a radio link via which a base station transmits data or a control signal to a UE. In such a multi-access scheme, normally data or control information of each user may be distinguished by assigning and operating time-frequency resources, at which the data or control information of each user is to be transmitted, so as not to overlap each other, that is, to establish orthogonality.

A 5G communication system, that is, a future communication system after LTE, should be able to freely reflect various requirements of users, service providers, etc., so that a service that concurrently satisfies various requirements should be supported. Services considered for the 5G communication system includes an enhanced mobile broadband (eMBB) communication, massive machine type communication (mMTC), ultra-reliability low latency communication (URLLC), and the like.

The eMBB aims to provide a data transmission rate that is more improved than a data transmission rate supported by existing LTE, LTE-A or LTE-Pro. For example, in the 5G communication system, an eMBB should be able to provide a maximum data rate (peak data rate) of 20 Gbps in a downlink and a peak data rate of 10 Gbps in an uplink from the perspective of one base station. The 5G communication system needs to provide a peak data rate while concurrently providing an increased actual user perceived data rate of a UE. In order to satisfy these requirements, improvement of various transmission or reception technologies including a more advanced multi-antenna (multi-input multi-output (MIMO)) transmission technology is required. A signal may be transmitted using a maximum transmission bandwidth of 20 MHz in a 2 GHz band used by LTE, whereas, in the 5G communication system, a data transmission rate, which is required by the 5G communication system, may be satisfied by using a frequency bandwidth wider than 20 MHz in a frequency band of 3 to 6 GHz or a frequency band of 6 GHz or higher.

Meantime, the mMTC is being considered to support application services, such as Internet of things (IoT), in the 5G communication system. In order to efficiently provide the IoT, the mMTC may require support of a large-scale UE access in a cell, coverage enhancement of a UE, an improved battery time, cost reduction of a UE, and the like. The IoT is attached to multiple sensors and various devices to support communication functions, so that the IoT should be able to support a large number of UEs (e.g., 1,000,000 UEs/km2) within a cell. Due to the nature of a service, a UE that supports the mMTC is likely to be located in a shaded region, which cannot be covered by a cell, such as the basement of a building, and therefore a wider coverage may be required compared to other services provided by the 5G communication system. The UE that supports the mMTC may be required to be a low-cost UE, and since it is difficult to frequently replace a battery of the UE, a very long battery lifetime, such as 10 to 15 years, may be required.

Finally, the URLLC corresponds to a cellular-based wireless communication service used for a specific purpose (mission-critical). For example, services, etc. used for a remote control of a robot or machinery, industrial automation, an unmanned aerial vehicle, remote health care, an emergency alert, and the like may be considered. Therefore, communication provided by the URLLC should also provide very low latency and very high reliability. For example, a service that supports the URLLC should satisfy an air interface latency less than 0.5 milliseconds and has requirements of a packet error rate of 10-5 or less at the same time. Therefore, for the service that supports the URLLC, the 5G system may be required to provide a transmit time interval (TTI) smaller than other services, and at the same time, design matters for allocating a wide resource in a frequency band may be required to secure the reliability of the communication link.

Three services of 5G, which are the eMBB, the URLLC, and the mMTC, may be multiplexed and transmitted in one system. Different transmission or reception techniques and transmission or reception parameters may be used between services in order to satisfy different requirements of respective services. 5G is not limited to the three services described above.

For convenience of description below, some terms and names defined in the 3GPP standard (standards of 5G, NR, LTE, or similar systems) may be used. However, the disclosure is not limited by the terms and names, and may be equally applied to systems conforming to other standards. Terms used for identifying an access node, terms indicating network entities, terms indicating messages, terms indicating interfaces between network entities, terms indicating various identification information, etc. used in the following description are illustrated for convenience of description. Therefore, the disclosure is not limited to the terms used herein, and other terms referring to objects having equivalent technical meanings may be used.

[NR Time-Frequency Resources]

Hereinafter, a frame structure of the 5G system will be described in more detail with reference to the drawings.

FIG. 1 is a diagram illustrating a basic structure of a time-frequency domain that is a radio resource region in which data or a control channel is transmitted in a 5G system.

In FIG. 1, a horizontal axis represents a time domain, and a vertical axis represents a frequency domain. A basic unit of a resource in the time and frequency domains is a resource element (RE) 101, and may be defined to be 1 orthogonal frequency division multiplexing (OFDM) symbol 102 on the time axis and 1 subcarrier 103 on the frequency axis. $N_{sc}^{RB}$ (e.g., 12) consecutive REs in the frequency domain may constitute one resource block (RB) 104. In FIG. 1, $N_{symb}^{subframe,\mu}$ is the number of OFDM symbols per subframe 110 for a subcarrier spacing configuration ($\mu$), and the TS 38.211 section 4 standards may be referred for a more detailed description of the resource structure in the 5G system.

Figure 2:
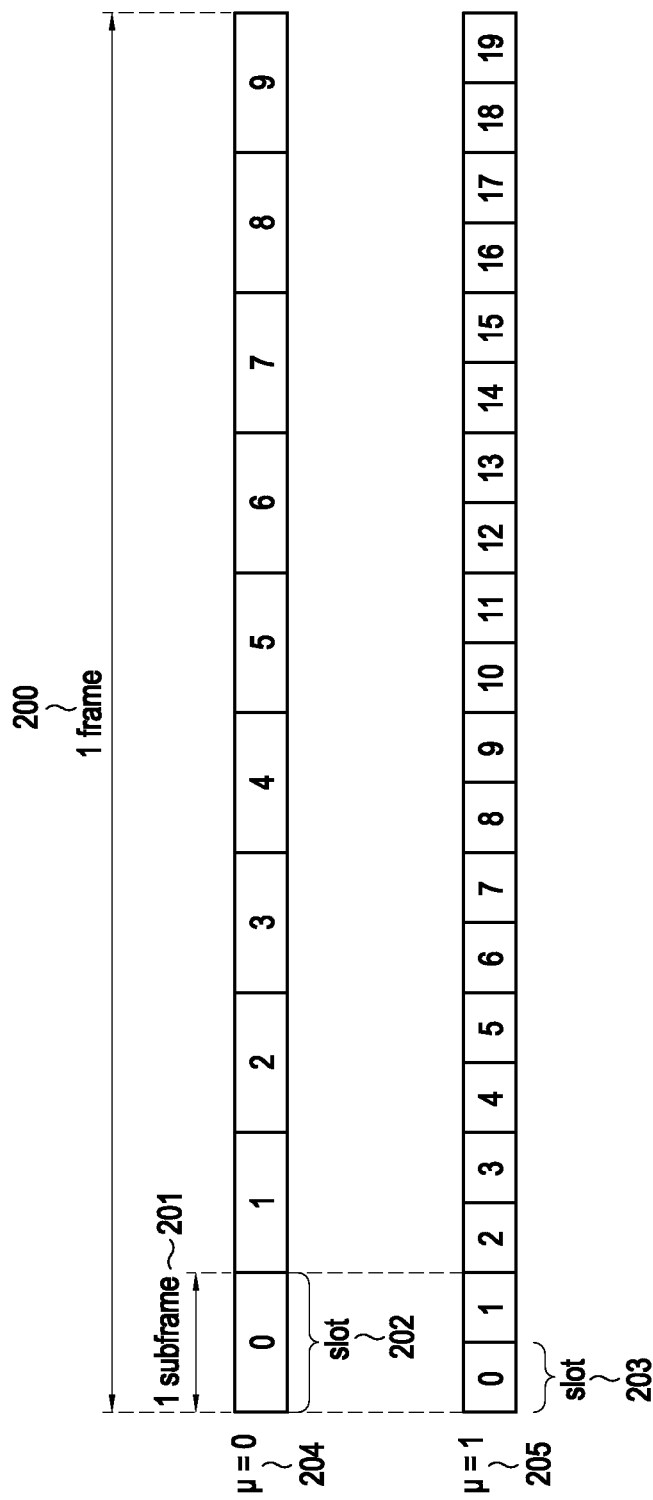
FIG. 2 is a diagram illustrating a frame, a subframe, and a slot structure in the wireless communication system according to an embodiment of the disclosure.

FIG. 2 is a diagram illustrating a slot structure considered in the 5G system.

FIG. 2 illustrates an example of a structure of a frame 200, a subframe 201, and a slot 202. One frame 200 may be defined to be 10 ms. One subframe 201 may be defined to be 1 ms, and thus one frame 200 may include a total of 10 subframes 201. One slot 202 or 203 may be defined as 14 OFDM symbols (that is, the number of symbols per slot ($N_{symb}^{slot}$)=14). One subframe out 201 may include one or multiple slots 202 and 203, and the number of slots 202 and 203 for one subframe 201 may vary according to configuration values $\mu$ 204 or 205 for subcarrier spacing. In an example of FIG. 2, a case where $\mu$=0 204, and a case where $\mu$=1 205 are illustrated as subcarrier spacing configuration values. In the case where $\mu$=0 204, one subframe 201 may include one slot 202, and in the case where $\mu$=1 205, one subframe 201 may include two slots 203. That is, the number ($N_{slot}^{subframe,\mu}$) of slots per subframe may vary according to the configuration value $\mu$ for the subcarrier spacing, and accordingly, the number ($N_{slot}^{frame,\mu}$) of slots per frame may vary. $N_{slot}^{subframe,\mu}$ and $N_{slot}^{frame,\mu}$ according to respective subcarrier spacing configurations $\mu$ may be defined in Table 1 below.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Next, a bandwidth part (BWP) configuration in the 5G communication system will be described in detail with reference to the drawings.

Figure 3:
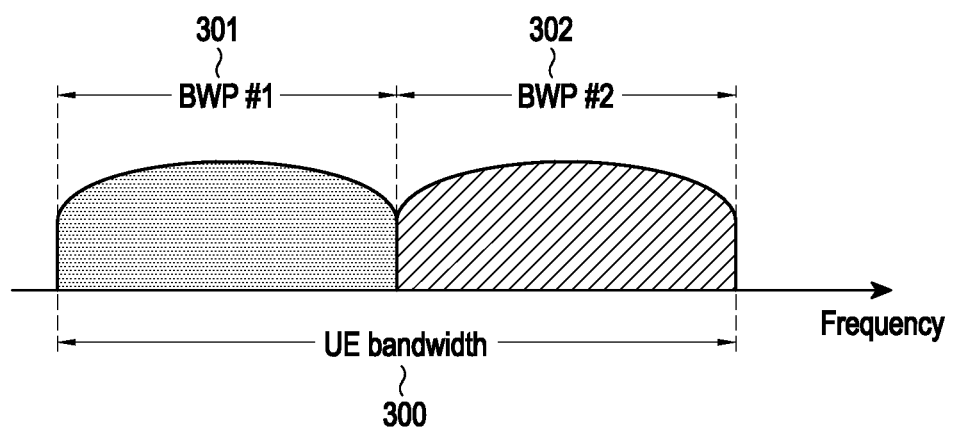
FIG. 3 is a diagram illustrating an example of a bandwidth part configuration in the wireless communication system according to an embodiment of the disclosure.

FIG. 3 is a diagram illustrating an example of a configuration for a bandwidth part in the 5G communication system.

FIG. 3 shows an example in which a UE bandwidth (UE bandwidth) 300 is configured to have two bandwidth parts that are bandwidth part #1 301 and bandwidth part #2 302. A base station may configure one or multiple bandwidth parts for a UE, and may configure the following information for each bandwidth part.

TABLE 2

| BWP ::= | SEQUENCE { |
|---|---|
| bwp-Id | BWP-Id, |
| (bandwidth part identity) | |
| locationAndBandwidth | INTEGER (1..65536), |
| (bandwidth part location) | |
| subcarrierSpacing | ENUMERATED {n0, n1, n2, n3, n4, n5}, |
| (Subcarrier spacing) | |
| cyclicPrefix | ENUMERATED { extended } |
| (cyclic prefix) | |
| } | |

In [Table 2], "locationAndBandwidth" indicates a location and a bandwidth in the frequency domain of a bandwidth part, "subcarrierSpacing" indicates a subcarrier spacing to be used in the bandwidth part, and "cyclicPrefix" indicates extension cyclic prefix (CP) for the bandwidth part.

The disclosure is not limited to the above example, and in addition to the configuration information, various parameters related to the bandwidth part may be configured for a UE. The base station may transfer the information to the UE via upper layer signaling, for example, radio resource control (RRC) signaling. At least one bandwidth part among the configured one or multiple bandwidth parts may be activated. Whether or not the configured bandwidth part is activated may be transferred from the base station to the UE in a semi-static manner via RRC signaling or may be dynamically transferred via downlink control information (DCI).

According to some embodiments, the base station may configure an initial bandwidth part (BWP) for initial access, via a master information block (MIB), for the UE before an RRC connection. More specifically, in an initial access stage, the UE may receive configuration information for a search space and a control region (control resource set (CORESET)) in which PDCCH for receiving system information (may correspond to remaining system information (RMSI) or system information block 1 (SIB1)) required for initial access may be transmitted via the MIB. Each of the search space and the control resource set configured via the MIB may be considered as identity (ID) 0. The control resource set and the search space configured via the MIB may be referred to as a common control resource set and a common search space, respectively. The base station may notify the UE of configuration information, such as frequency allocation information, time allocation information, and numerology for control resource set #0, via the MIB. The base station may notify the UE of configuration information for a monitoring period and occasion for control resource set #0, that is, the configuration information for search space #0, via the MIB. The UE may consider a frequency domain configured to control resource set #0, which is obtained from the MIB, as an initial bandwidth part for initial access. In this case, an identity (ID) of the initial bandwidth part may be considered to be 0. The control resource set may be referred to as a control region, a control resource region, or the like.

The configuration of a bandwidth part supported by 5G may be used for various purposes.

According to some embodiments, when a bandwidth supported by the UE is smaller than a bandwidth supported by a system bandwidth, this may be supported via the bandwidth part configuration. For example, the base station may configure a frequency location of the bandwidth part to the UE so that the UE may transmit or receive data at a specific frequency location within the system bandwidth.

According to some embodiments, for the purpose of supporting different numerologies, the base station may configure multiple bandwidth parts for the UE. For example, in order to support both data transmission or reception using a subcarrier spacing of 15 kHz and a subcarrier spacing of 30 kHz for a certain UE, two bandwidth parts may be configured to subcarrier spacings of 15 kHz and 30 kHz, respectively. Different bandwidth parts may be frequency-division-multiplexed, and when data is to be transmitted or received at a specific subcarrier spacing, a bandwidth part configured to the subcarrier spacing may be activated.

According to some embodiments, for the purpose of reducing power consumption of the UE, the base station may configure, for the UE, bandwidth parts having different bandwidth sizes. For example, if the UE supports a very large bandwidth, for example, 100 MHz, and always transmits or receives data via the corresponding bandwidth, very large power consumption may occur. In particular, in a situation where there is no traffic, it may be very inefficient, in terms of power consumption, to perform monitoring for an unnecessary downlink control channel with a large bandwidth of 100 MHz. For the purpose of reducing the power consumption of the UE, the base station may configure, for the UE, a bandwidth part of a relatively small bandwidth, for example, a bandwidth part of 20 MHz. In the situation where there is no traffic, the UE may perform monitoring in the bandwidth part of 20 MHz, and when data is generated, the UE may transmit or receive the data by using the bandwidth part of 100 MHz according to an indication of the base station.

In the method for configuring the bandwidth part, UEs before an RRC connection may receive configuration information for an initial bandwidth part via a master information block (MIB) in an initial access stage. More specifically, a UE may be configured with a control resource set (CORESET) for a downlink control channel via which downlink control information (DCI) for scheduling of a system information block (SIB) may be transmitted from an MIB of a physical broadcast channel (PBCH). A bandwidth of the control resource set configured via the MIB may be regarded as an initial bandwidth part, and the UE may receive an SIB on a physical downlink shared channel (PDSCH) via the configured initial bandwidth part. In addition to the purpose of receiving the SIB, the initial bandwidth part may be used for other system information (OSI), paging, and random access.

[SS/PBCH Block]

In the following, a synchronization signal (SS)/PBCH block (SSB) in 5G will be described.

The SS/PBCH block may refer to a physical layer channel block including a primary SS (PSS), a secondary SS (SSS), and a PBCH. Detailed descriptions are as follows:

PSS: a signal that serves as a reference for downlink time/frequency synchronization and provides some information on a cell ID;

SSS: serving as a reference for downlink time/frequency synchronization, and providing remaining cell ID information that is not provided by a PSS. Additionally, the SSS may serve as a reference signal for demodulation of a PBCH;

PBCH: providing essential system information necessary for transmitting or receiving data channel and control channel of a UE. The essential system information may include search space-related control information indicating radio resource mapping information of a control channel, scheduling control information on a separate data channel for transmitting system information, and the like; and SS/PBCH block: an SS/PBCH block includes a combination of a PSS, an SSS, and a PBCH. One or multiple SS/PBCH blocks may be transmitted within 5 ms, and each transmitted SS/PBCH block may be distinguished by an index.

A UE may detect a PSS and an SSS in an initial access stage and may decode a PBCH. An MIB may be obtained from the PBCH, and control resource set (CORESET) #0 (which may correspond to a control resource set having a control resource set index of 0) may be configured therefrom. For example, the UE may perform monitoring on control resource set #0 while assuming (QCL assumption) that a selected SS/PBCH block and a demodulation reference signal (DMRS) transmitted in control resource set #0 are quasi-co-located (QCL). The UE may receive system information by using downlink control information transmitted in control resource set #0. The UE may acquire random access channel (RACH)-related configuration information required for initial access from the received system information. The UE may transmit a physical RACH (PRACH) to the base station in consideration of a selected SS/PBCH index, and the base station having received the PRACH may acquire information on an SS/PBCH block index selected by the UE. The base station may know that the UE has selected a certain block from among respective SS/PBCH blocks and monitors control resource set #0 associated therewith.

[DRX]

Figure 6:
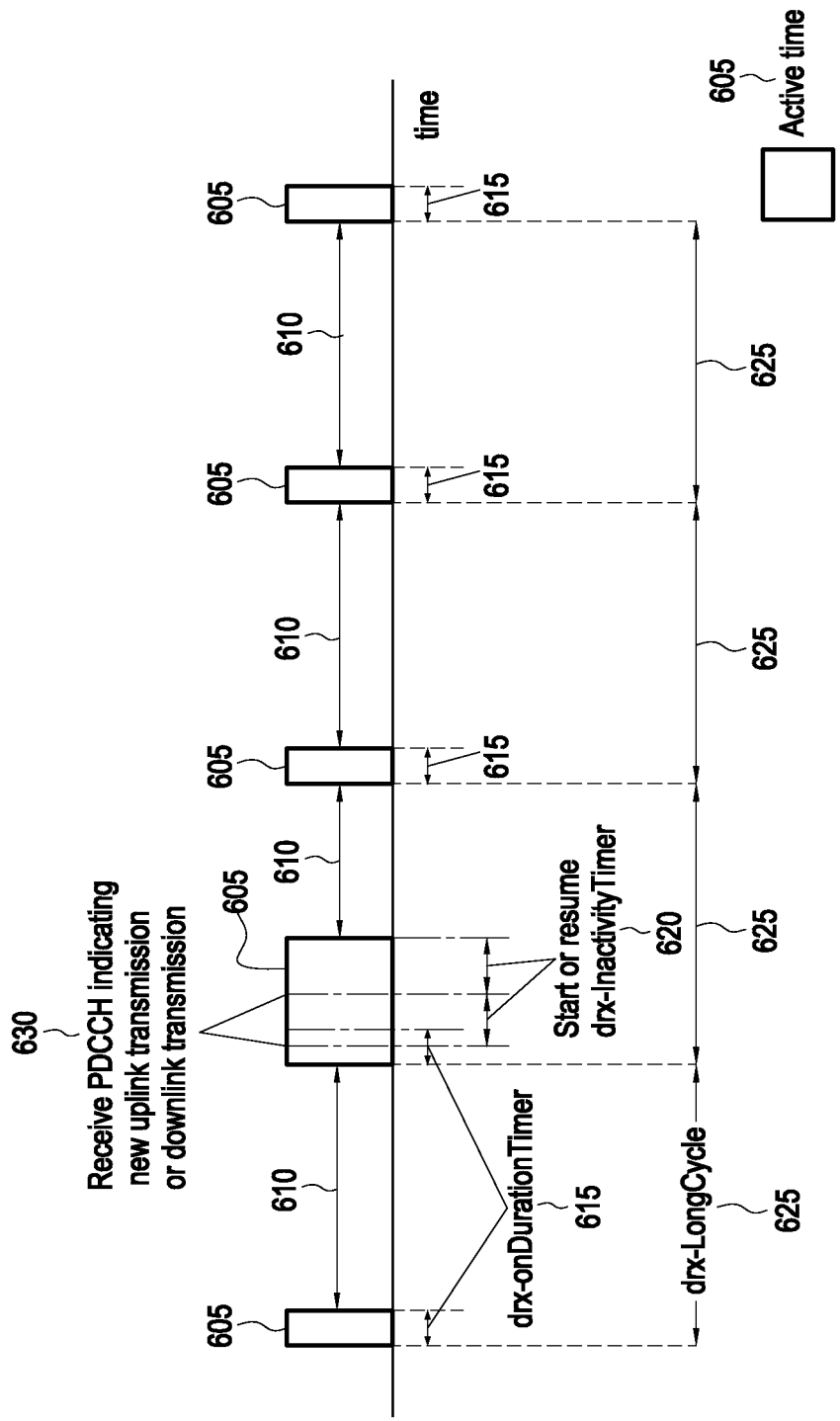
FIG. 6 is a diagram illustrating an example of a DRX operation in the wireless communication system according to an embodiment of the disclosure.

FIG. 6 is a diagram illustrating discontinuous reception (DRX).

A discontinuous reception (DRX) operation in an RRC connected state is an operation in which a UE using a service discontinuously receives data in the RRC connected state in which a radio link is established between a base station and the UE. The DRX operation is also referred to as C-DRX. When DRX is applied, the UE turns on a receiver at a specific time point to monitor a control channel, and if there is no data received for a certain period of time, the UE turns off the receiver to reduce power consumption of the UE. The DRX operation may be controlled by a MAC layer device, based on various parameters and timers.

Referring to FIG. 6, an active time 605 is a time during which the UE wakes up every DRX cycle and monitors PDCCH. The active time 605 may be defined as follows:

drx-onDurationTimer, drx-InactivityTimer, drx-RetransmissionTimerDL, drx-RetransmissionTimerUL, or ra-ContentionResolutionTimer is running;

a Scheduling Request is sent on PUCCH and is pending; or a PDCCH indicating a new transmission addressed to the C-RNTI of the MAC entity has not been received after successful reception of a random access response for the random access preamble not selected by the MAC entity among the contention-based random access preamble.

The drx-onDurationTimer, drx-InactivityTimer, drx-RetransmissionTimerDL, drx-RetransmissionTimerUL, ra-ContentionResolutionTimer, etc. are timers the values of which are configured by the base station, and have a function of configuring the UE to monitor PDCCH when a predetermined condition is satisfied.

drx-onDurationTimer 615 is a parameter for configuration of a minimum time in which the UE is awake in the DRX cycle. drx-InactivityTimer 620 is a parameter for configuration of an additional awake time of the UE when PDCCH indicating new uplink transmission or downlink transmission is received 630. drx-RetransmissionTimerDL is a parameter for configuration of a maximum time in which the UE is awake to receive downlink retransmission in a downlink HARQ procedure. drx-RetransmissionTimerUL is a parameter for configuration of a maximum time in which the UE is awake to receive an uplink retransmission grant in an uplink HARQ procedure. drx-onDurationTimer, drx-InactivityTimer, drx-RetransmissionTimerDL, and drx-RetransmissionTimerUL may be configured to, for example, time, the number of subframes, the number of slots, and the like. ra-ContentionResolutionTimer is a parameter for monitoring of PDCCH in a random access procedure.

inActive time 610 is a time configured not to monitor PDCCH or a time configured not to receive PDCCH during the DRX operation, and inActive time 610 may be the time remaining after excluding Active time 605 from the total time for performing the DRX operation. If the UE does not monitor PDCCH during active time 605, the UE may enter a sleep or inActive state so as to reduce power consumption.

A DRX cycle refers to a cycle in which the UE wakes up and monitors PDCCH.

That is, the DRX cycle refers to an on duration generation period or a time interval from PDCCH monitoring to subsequent PDCCH monitoring by the UE. There are two types of the DRX cycle: a short DRX cycle and a long DRX cycle. The short DRX cycle may be optionally applied.

The long DRX cycle 625 is the longer cycle among the two DRX cycles configured for the UE. During operation in long DRX, the UE starts drx-onDurationTimer 615 again at a point in time when the long DRX cycle 625 has elapsed from a start point (e.g., start symbol) of drx-onDurationTimer 615. When operating in the long DRX cycle 625, the UE may start drx-onDurationTimer 615 in a slot after drx-SlotOffset in a subframe satisfying [Equation 1] below. Here, drx-SlotOffset refers to a delay before starting drx-onDurationTimer 615. drx-SlotOffset may be configured, for example, to time, the number of slots, etc. as shown in [Equation 1] below:

[(SFN×10)subframe number]modulo(drx-LongCycle)=drx-StartOffset [Equation 1]

Here, for drx-LongCycleStartOffset, the long DRX cycle 625 and drx-StartOffset may be used to define a subframe in which the long DRX cycle 625 starts. drx-LongCycleStartOffset may be configured to, for example, time, the number of subframes, the number of slots, and the like.

[PDCCH: Related to DCI]

Next, downlink control information (DCI) in the 5G system will be described in detail.

In the 5G system, scheduling information on uplink data (or physical uplink data channel (PUSCH)) or downlink data (or physical downlink data channel (PDSCH)) is transferred from the base station to the UE via DCI. The UE may monitor a DCI format for fallback and a DCI format for non-fallback with respect to PUSCH or PDSCH. The DCI format for fallback may include a fixed field predefined between the base station and the UE, and the DCI format for non-fallback may include a configurable field.

DCI may be transmitted through a physical downlink control channel (PDCCH) via channel coding and modulation. A cyclic redundancy check (CRC) is attached to a DCI message payload, and may be scrambled with a radio network temporary identifier (RNTI) corresponding to an identity of the UE. Different RNTIs may be used according to a purpose of the DCI message, for example, UE-specific (UE-specific) data transmission, a power control command, a random access response, etc. That is, the RNTI is not explicitly transmitted, but is included in CRC calculation so as to be transmitted. When the DCI message transmitted on PDCCH is received, the UE performs a CRC check by using an assigned RNTI and determines, if the CRC check succeeds, that the message is addressed to the UE.

For example, DCI for scheduling of PDSCH for system information (SI) may be scrambled with an SI-RNTI. DCI for scheduling of PDSCH for a random access response (RAR) message may be scrambled with RA-RNTI. DCI for scheduling of PDSCH for a paging message may be scrambled with P-RNTI. DCI for notification of a slot format indicator (SFI) may be scrambled with SFI-RNTI. DCI for notification of a transmit power control (TPC) may be scrambled with TPC-RNTI. DCI for scheduling of UE-specific PDSCH or PUSCH may be scrambled with cell RNTI (C-RNTI).

DCI format 0_0 may be used for fallback DCI for scheduling of PUSCH, in which CRC may be scrambled with C-RNTI. DCI format 0_0 in which CRC is scrambled with C-RNTI may include, for example, the following information.

TABLE 3

Identifier for DCI formats - [1] bit
Frequency domain resource assignment -
[⌈log$_2$(N$_{RB}^{UL, BWP}$(N$_{RB}^{UL, BWP}$ + 1)/2)⌉] bits
Time domain resource assignment - X bits
Frequency hopping flag - 1 bit.
Modulation and coding scheme - 5 bits
New data indicator - 1 bit
Redundancy version - 2 bits
HARQ process number - 4 bits
Transmit power control (TPC) command for scheduled PUSCH - [2] bits
Uplink (UL)/supplementary UL (SUL) indicator - 0 or 1 bit DCI format 0_1 may be used for non-fallback DCI for scheduling of PUSCH, in which CRC may be scrambled with C-RNTI. DCI format 0_1 in which CRC is scrambled with C-RNTI may include, for example, the following information.

TABLE 4

Carrier indicator - 0 or 3 bits
UL/SUL indicator – 0 or 1 bit
Identifier for DCI formats – [1] bits
Bandwidth part indicator - 0, 1 or 2 bits
Frequency domain resource assignment
For resource allocation type 0, [⌈N$_{RB}^{UL,BWP}$/P⌉] bits
For resource allocation type 1, [⌈log$_2$(N$_{RB}^{UL,BWP}$(N$_{RB}^{UL,BWP}$ + 1)/2)⌉] bits
Time domain resource assignment –1, 2, 3, or 4 bits
Virtual resource block (VRB)-to-physical resource block (PRB) mapping - 0 or 1 bit, only for resource allocation type 1.

TABLE 4-continued 0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1st downlink assignment index - 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK sub-codebooks;
0 bit otherwise.
TPC command for scheduled PUSCH - 2 bits $SRS \text{ resource indicator} - \left\lfloor \log_2\left(\sum_{k=1}^{L_{max}} \binom{N_{SRS}}{k}\right)\right\rfloor$ or $\lceil \log_2(N_{SRS}) \rceil$ bits $\left\lceil \log_2\left(\sum_{k=1}^{L_{max}} \binom{N_{SRS}}{k}\right)\right\rceil$ bits for non-codebook based PUSCH transmission;

$\lceil \log_2(N_{SRS}) \rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
Code block group (CBG) transmission information - 0, 2, 4, 6, or 8 bits
Phase tracking reference signal-demodulation reference signal relationship (PTRS-DMRS association) - 0 or 2 bits.
beta_offset indicator - 0 or 2 bits
Demodulation reference signal (DMRS) sequence initialization - 0 or 1 bit DCI format 1_0 may be used for fallback DCI for scheduling of PDSCH, in which CRC may be scrambled with C-RNTI. DCI format 1_0 in which CRC is scrambled with C-RNTI may include, for example, the following information.

TABLE 5

Identifier for DCI formats - [1] bit
Frequency domain resource assignment -[[$\log_2(N_{RB}^{DL, BWP}(N_{RB}^{DL, BWP} + 1)/2)$]] bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
Physical uplink control channel (PUCCH) resource indicator - 3 bits
PDSCH-to-HARQ feedback timing indicator - [3] bits DCI format 1_1 may be used for non-fallback DCI for scheduling of PUSCH, in which CRC may be scrambled with C-RNTI. DCI format 1_1 in which CRC is scrambled with C-RNTI may include, for example, the following information.

TABLE 6

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{DL, BWP}/P \rceil$ bits
For resource allocation type 1, $\lceil \log_2(N_{RB}^{DL, BWP}(N_{RB}^{DL, BWP} + 1)/2) \rceil$ bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
Physical resource block (PRB) bundling size indicator - 0 or 1 bit
Rate matching indicator - 0, 1, or 2 bits
Zero power channel state information reference signal (ZP CSI-RS) trigger - 0, 1, or 2 bits
For transport block 1:
Modulation and coding scheme - 5 bits
Modulation and coding scheme - 5 bits
Redundancy version - 2 bits
For transport block 2
Modulation and coding scheme - 5 bits
Modulation and coding scheme - 5 bits
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
Code block group (CBG) flushing out information - 0 or 1 bit
DMRS sequence initialization - 1 bit- DMRS sequence initialization- 1 bit

[PDCCH: CORESET, REG, CCE, Search Space]

Hereinafter, a downlink control channel in the 5G communication system will be described in more detail with reference to the drawings.

Figure 4:
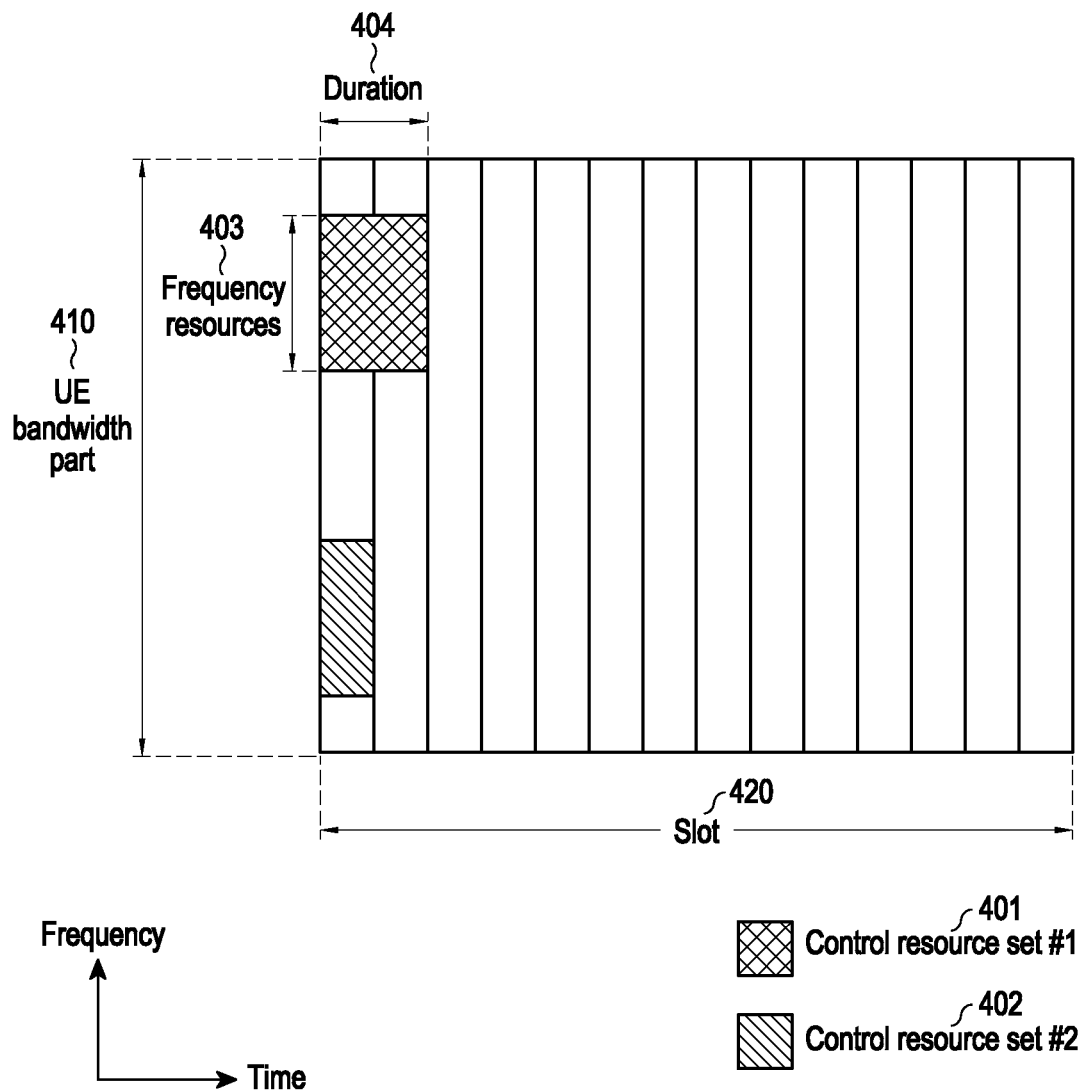
FIG. 4 is a diagram illustrating an example of a control resource set configuration of a downlink control channel in the wireless communication system according to an embodiment of the disclosure.

FIG. 4 is a diagram illustrating an example of a control resource set (CORESET) at which a downlink control channel is transmitted in the 5G wireless communication system.

FIG. 4 illustrates an example in which a bandwidth part 410 of a UE (UE bandwidth part) is configured on the frequency axis, and two control resource sets (control resource set #1 401 and control resource set #2 402) are configured within one slot 420 on the time axis. The control resource sets 401 and 402 may be configured for a specific frequency resource within the entire UE bandwidth part 410 on the frequency axis. FIG. 4 illustrates an example in which a specific frequency resource 403 is a frequency resource configured for control resource set #1 401. For the control resource set, one or multiple OFDM symbols may be configured on the time axis, which may be defined as a control resource duration length 404. Referring to the example illustrated in FIG. 4, control resource set #1 401 is configured to be a control resource set duration of 2 symbols, and control resource set #2 402 is configured to be a control resource set duration of 1 symbol.

The aforementioned control resource sets in 5G may be configured for a UE by a base station via upper layer signaling (e.g., system information, master information block (MIB), radio resource control (RRC) signaling), DCI, or the like. Configuring a control resource set for a UE refers to providing information, such as an identity of the control resource set, a frequency location of the control resource set, and a symbol length of the control resource set. Configuration information for a control resource set may include, for example, the following information.

TABLE 7

```
ControlResourceSet ::=                SEQUENCE {
-- Corresponds to L1 parameter 'CORESET-ID'
  controlResourceSetId               ControlResourceSetId,
    (control region identity)
  frequencyDomainResources           BIT STRING (SIZE (45)),
    (frequency axis resource allocation information)
  duration                           INTEGER
(1..maxCoReSetDuration),
    (time axis resource allocation information)
  cce-REG-MappingType                CHOICE {
    (CCE-to-REG mapping scheme)
      interleaved                    SEQUENCE {
        reg-BundleSize               ENUMERATED {n2, n3,
n6},
        (REG bundle size)
        precoderGranularity          ENUMERATED
{sameAsREG-bundle, allContiguousRBs},
        interleaverSize              ENUMERATED
                                     {n2, n3, n6}
        (interleaver size)
        shiftIndex
    INTEGER(0..maxNrofPhysicalResourceBlocks-1)
    OPTIONAL
        (interleaver shift)
      },
      nonInterleaved                 NULL
    },
    tci-StatesPDCCH                  SEQUENCE(SIZE
(1..maxNrofTCI-StatesPDCCH)) OF     OPTIONAL,
TCI-StateId
      (QCL configuration information)
    tci-PresentInDCI                 ENUMERATED {enabled}
                                     OPTIONAL, -- Need S
}
```

In [Table 7], tci-StatesPDCCH (simply, referred to as a transmission configuration indication (TCI) state) configuration information may include information on one or multiple synchronization signal (SS)/physical broadcast channel (PBCH) block (SSB) indices or channel state information reference signal (CSI-RS) indices having the quasi-co-location (QCL) relationship with a DMRS transmitted in the corresponding control resource set.

Figure 5A:
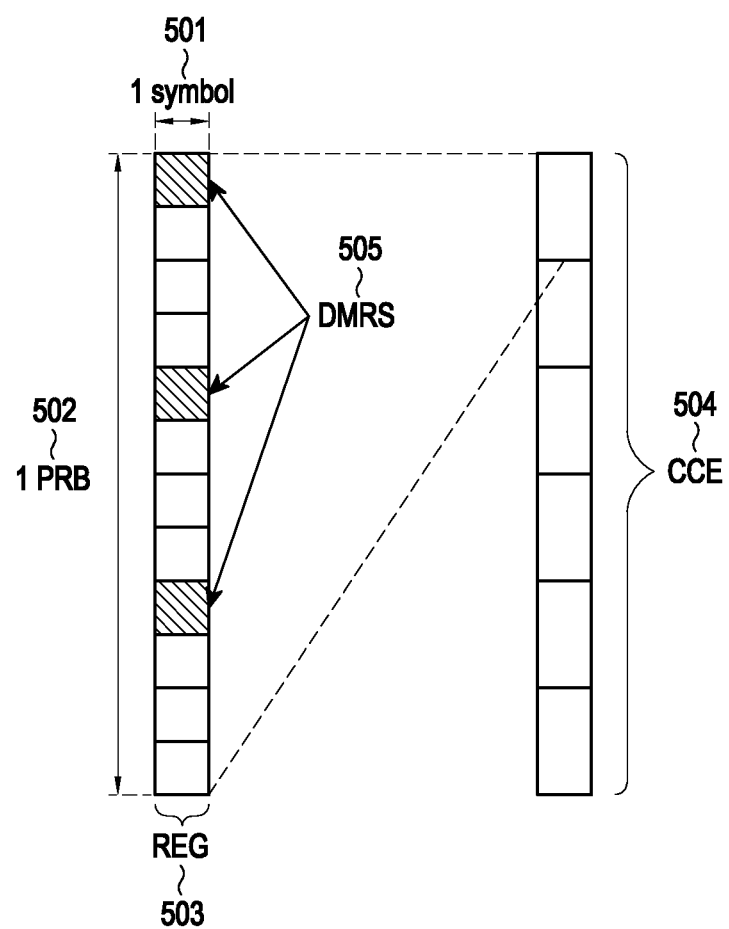
FIG. 5A is a diagram illustrating a structure of a downlink control channel in the wireless communication system according to an embodiment of the disclosure.

FIG. 5A is a diagram showing an example of a basic unit of time and frequency resources constituting a downlink control channel which may be used in 5G.

According to FIG. 5A, a basic unit of time and frequency resources constituting a control channel (PDCCH) may be referred to as a resource element group (REG) 503, and the REG 503 may be defined as 1 OFDM symbol 501 on the time axis and 1 physical resource block (PRB) 502 on the frequency axis, that is, 12 subcarriers. A base station may configure a downlink control channel assignment unit by concatenating the REG 503.

As illustrated in FIG. 5A, when a basic unit for assignment of a downlink control channel in 5G is a control channel element (CCE) 504, 1 CCE 504 may include multiple REGs 503. Taking the REG 503 illustrated in FIG. 5A as an example, the REG 503 may include 12 REs, and if, 1 CCE 504 includes, for example, 6 REGs 503, 1 CCE 504 may include 72 REs. When a downlink control resource set is configured, a corresponding region may include multiple CCEs 504, and a specific downlink control channel may be mapped to one or multiple CCEs 504 so as to be transmitted according to an aggregation level (AL) within the control resource set. The CCEs 504 within the control resource set are classified by numbers, and the numbers of the CCEs 504 may be assigned according to a logical mapping scheme.

The basic unit of the downlink control channel illustrated in FIG. 5A, that is, the REG 503, may include both REs, to which DCI is mapped, and a region, to which a DMRS 505 that is a reference signal for decoding the REs, is mapped. As shown in FIG. 5A, 3 DMRSs 505 may be transmitted within 1 REG 503. The number of CCEs required to transmit PDCCH may be 1, 2, 4, 8, or 16 depending on the aggregation level (AL), and the different numbers of CCEs may be used to implement link adaptation of the downlink control channel. For example, if AL=L, one downlink control channel may be transmitted via the L number of CCEs. A UE needs to detect a signal without knowing information on the downlink control channel, wherein a search space representing a set of CCEs is defined for blind decoding. The search space is a set of downlink control channel candidate groups (candidates) including CCEs, for which the UE needs to make an attempt of decoding on a given aggregation level. Since there are various aggregation levels that make one bundle with 1, 2, 4, 8, or 16 CCEs, the UE may have multiple search spaces. A search space set may be defined as a set of search spaces at all configured aggregation levels.

The search space may be classified into a common search space and a UE-specific (UE-specific) search space. A certain group of UEs or all UEs may monitor a common search space of PDCCH in order to receive cell-common control information, such as a dynamic scheduling or paging message for system information. For example, PDSCH scheduling assignment information for transmission of an SIB including cell operator information, etc. may be received by monitoring the common search space of PDCCH. In the case of the common search space, the certain group of UEs or all UEs need to receive PDCCH, and may thus be defined as a set of previously agreed CCEs. Scheduling assignment information for UE-specific PDSCH or PUSCH may be received by monitoring a UE-specific search space of PDCCH. The UE-specific search space may be defined UE-specifically on the basis of an identity of the UE and functions of various system parameters.

In 5G, a parameter for the search space of PDCCH may be configured from the base station to the UE via upper layer signaling (e.g., SIB, MIB, and RRC signaling). For example, the base station may configure, to the UE, the number of PDCCH candidate groups at each aggregation level L, a monitoring period for a search space, a monitoring occasion per symbol in a slot for the search space, a search space type (common search space or UE-specific search space), a combination of an RNTI and a DCI format, which is to be monitored in the search space, a control resource set index for monitoring of the search space, etc. Configuration information on the search space for the PDCCH may include, for example, information in [Table 8] below.

TABLE 8

```
SearchSpace ::=                      SEQUENCE {
-- Identity of the search space. SearchSpaceId = 0 identifies the
SearchSpace configured via PBCH (MIB) or ServingCellConfigCommon.
  searchSpaceId                      SearchSpaceId,
    (search space identity)
  controlResourceSetId               ControlResourceSetId,
    (control region identity)
  monitoringSlotPeriodicityAndOffset CHOICE {
    (monitoring slot level period)
    sl1                              NULL,
    sl2                              INTEGER (0..1),
    sl4                              INTEGER (0..3),
    sl5                              INTEGER (0..4),
    sl8                              INTEGER (0..7),
    sl10                             INTEGER (0..9),
    sl16                             INTEGER (0..15),
    sl20                             INTEGER (0..19)
  }
}
```

TABLE 8-continued

```
                                    OPTIONAL,
    duration(monitoring duration) INTEGER (2..2559)
    monitoringSymbolsWithinSlot            BIT STRING
                                           (SIZE (14))
                                           OPTIONAL,
    (monitoring symbol in slots)
    nrofCandidates                         SEQUENCE {
        (number of PDCCH candidate groups per aggregation level)
        aggregationLevel1                  ENUMERATED {n0,
n1, n2, n3, n4, n5, n6, n8},
        aggregationLevel2                  ENUMERATED {n0,
n1, n2, n3, n4, n5, n6, n8},
        aggregationLevel4                  ENUMERATED {n0,
n1, n2, n3, n4, n5, n6, n8},
        aggregationLevel8                  ENUMERATED {n0,
n1, n2, n3, n4, n5, n6, n8},
        aggregationLevel16                 ENUMERATED {n0,
n1, n2, n3, n4, n5, n6, n8}
    },
    searchSpaceType                        CHOICE {
    (search space type)
    -- Configures this search space as common search space (CSS)
and DCI formats to monitor.
        common                             SEQUENCE {
        (Common search space)
        }
        ue-Specific                        SEQUENCE {
        (UE-specific search space)
        -- Indicates whether the UE monitors in this USS for DCI
formats 0-0 and 1-0 or for formats 0-1 and 1-1.
            formats                        ENUMERATED
{formats0-0-And-1-0, formats0-1-And-1-1},
            ...
        }
```

According to the configuration information, the base station may configure one or multiple search space sets for the UE. According to some embodiments, the base station may configure search space set 1 and search space set 2 to the UE, may configure DCI format A, which is scrambled with X-RNTI in search space set 1, to be monitored in the common search space, and may configure DCI format B, which is scrambled with Y-RNTI in search space set 2, to be monitored in the UE-specific search space. In the X-RNTI and Y-RNTI, "X" and "Y" may correspond to one of various RNTIs to be described later.

According to the configuration information, one or multiple search space sets may exist in the common search space or the UE-specific search space. For example, search space set #1 and search space set #2 may be configured to be the common search space, and search space set #3 and search space set #4 may be configured to be the UE-specific search space.

In the common search space, the following combinations of DCI formats and RNTIs may be monitored. Of course, the disclosure is not limited to the following examples:
DCI format 0_0/1_0 with CRC scrambled by C-RNTI, CS-RNTI, SP-CSI-RNTI, RA-RNTI, TC-RNTI, P-RNTI, SI-RNTI;
DCI format 2_0 with CRC scrambled by SFI-RNTI;
DCI format 2_1 with CRC scrambled by INT-RNTI;
DCI format 2_2 with CRC scrambled by TPC-PUSCH-RNTI, TPC-PUCCH-RNTI; and
DCI format 2_3 with CRC scrambled by TPC-SRS-RNTI.

In the UE-specific search space, the following combinations of DCI formats and RNTIs may be monitored. Of course, the disclosure is not limited to the following examples:
DCI format 0_0/1_0 with CRC scrambled by C-RNTI, CS-RNTI, TC-RNTI; and
DCI format 1_0/1_1 with CRC scrambled by C-RNTI, CS-RNTI, TC-RNTI.

The RNTIs specified above may comply with the following definition and purpose:
Cell RNTI (C-RNTI): used for UE-specific PDSCH scheduling;
Temporary cell RNTI (TC-RNTI): used for UE-specific PDSCH scheduling;
Configured scheduling RNTI (CS-RNTI): used for semi-statically configured UE-specific PDSCH scheduling;
Random Access RNTI (RA-RNTI): used for scheduling PDSCH at random access stage;
Paging RNTI (P-RNTI): used for scheduling PDSCH through which paging is transmitted;
System Information RNTI (SI-RNTI): used for scheduling PDSCH through which system information is transmitted;
Interruption RNTI (INT-RNTI): used for indicating whether puncturing is performed for PDSCH;
Transmit power control for PUSCH RNTI (TPC-PUSCH-RNTI): used for indicating PUSCH power control command;
Transmit power control for PUCCH RNTI (TPC-PUCCH-RNTI): used for indicating PUCCH power control command; and
Transmit power control for SRS RNTI (TPC-SRS-RNTI): used for indicating SRS power control command.

The aforementioned DCI formats may comply with the following definition.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a search space of aggregation level L in control resource set p and search space set s may be expressed as [Equation 2] below:

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i, \quad \text{[Equation 2]}$$

where
L: aggregation level;
$n_{CI}$: carrier index;
$N_{CCE,p}$: the total number of CCEs existing in control resource set p;
$n_{s,f}^{\mu}$: slot index;
$M_{p,s,max}^{(L)}$: the number of PDCCH candidate groups at aggregation level L;
$m_{s,n_{CI}} = 0, \ldots, M_{p,s,max}^{(L)} - 1$: index of a PDCCH candidate group at aggregation level L;
i = 0, ..., L−1;
$Y_{p,n_{s,f}^{\mu}} = (A_p \cdot Y_{p,n_{s,f}^{\mu}-1}) \bmod D$, $Y_{p,-1} = n_{RNTI} \neq 0$, $A_0 = 39827$, $A_1 = 39829$, $A_2 = 39839$, D = 65537; and
$n_{RNTI}$: identity.

A value of Y_(p,nµs,f) may correspond to 0 in a common search space.

In the case of the UE-specific search space, a value of Y_(p,nµs,f) may correspond to a value that varies depending on a time index and the identity (ID configured for the UE by C-RNTI or the base station) of the UE.

In 5G, multiple search space sets may be configured by different parameters (e.g., parameters in [Table 8]), and therefore a set of search spaces monitored by the UE at each point in time may vary. For example, when search space set #1 is configured in an X-slot cycle, search space set #2 is configured in a Y-slot cycle, and X and Y are different from each other, the UE may monitor both search space set #1 and search space set #2 in a specific slot, and may monitor one of search space set #1 and search space set #2 in a specific slot.

[Pdcch: Span]

The UE may report UE capability (UE capability) to the base station for each subcarrier spacing in the case of having multiple PDCCH monitoring locations within a slot, and in this case, the concept of span may be used. Span refers to continuous symbols in which the UE may monitor PDCCH in a slot, and each PDCCH monitoring location is within one span. Span may be expressed as (X,Y), where X refers to the minimum number of symbols that may be separated between first symbols of two consecutive spans, and Y refers to the number of consecutive symbols in which PDCCH can be monitored within one span. The UE may monitor, within a span, PDCCH in an interval between a first symbol and symbol Y of the span.

Figure 5B:
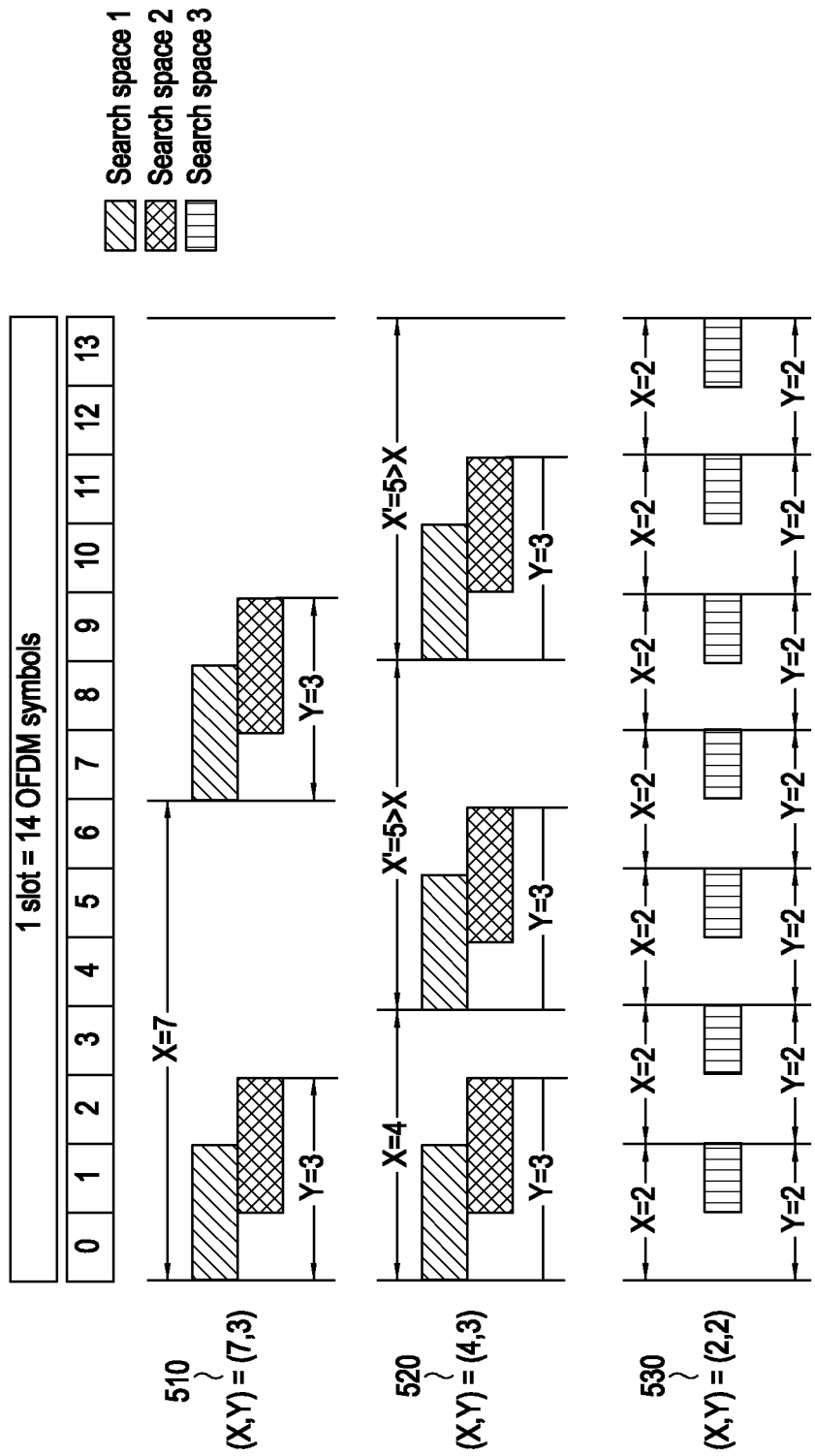
FIG. 5B is a diagram illustrating, via a span, a case in which a UE may have multiple PDCCH monitoring locations within a slot in the wireless communication system according to an embodiment of the disclosure.

FIG. 5B is a diagram illustrating, via a span, a case in which a UE may have multiple PDCCH monitoring locations within a slot in the wireless communication system.

Referring to FIG. 5B, cases in which, for example, (X, Y)=(7, 3), (X, Y)=(4, 3), and (X, Y)=(2, 2) are possible, and three cases are illustrated as reference numerals 510, 520, and 530 in FIG. 5B, respectively. As an example, reference numeral 510 represents a case in which two spans that may be expressed as (7, 3) exist within a slot. It is indicated that the interval between the first symbols of two spans is expressed as X=7, PDCCH monitoring locations may exist within a total of Y=3 symbols from the first symbol of each span, and each of search spaces 1 and 2 exists within Y=3 symbols. As another example, reference numeral 520 represents a case where there are a total of three spans in a slot, which may be expressed as (4, 3), and an interval between second and third spans indicates separation by X'=5 symbols which are greater than X=4. Reference numeral 530 represents a case where there are a total of seven spans in a slot, which may be expressed as (2, 2), and indicates that PDCCH monitoring locations may exist within a total of Y=2 symbols from a first symbol of each span, and search space 3 exists within Y=2 symbols.

[PDCCH: UE Capability Report]

The slot locations at which the common search space and the UE-specific search space are located are indicated via the monitoringSlotPeriodicityAndOffset parameter in [Table 8] showing configuration information on the search space for PDCCH, and the symbol location within the slot is indicated by a bitmap via the monitoringSymbolsWithinSlot parameter in [Table 8]. The symbol location in the slot, at which the UE is able to monitor the search space may be reported to the base station via the following UE capability (UE capability).

In one example of UE capability 1 (hereinafter, expressed as "feature group (FG) 3-1)"), UE capability 1 refers to, if one monitoring location (monitoring occasion (MO)) for type 1 and type 3 common search spaces or the UE-specific search space exists in the slot, the capability to monitor the MO when the MO is located within the first 3 symbols in the slot, as shown in [Table 10] below. The UE capability 1 is a mandatory capability that all UEs supporting NR may support, and whether UE capability 1 is supported may not be explicitly reported to the base station.

TABLE 10

| Index | Feature group | Components | Field name in TS 38.331 [2] |
|---|---|---|---|
| 3-1 | Basic DL control channel | 1) One configured CORESET per BWP per cell in addition to CORESET0 CORESET resource allocation of 6RB bit-map and duration of 1-3 OFDM symbols for FR1 For type 1 CSS without dedicated RRC configuration and for type 0, 0A, and 2 CSSs, CORESET resource allocation of 6RB bit-map and duration 1-3 OFDM symbols for FR2 For type 1 CSS with dedicated RRC configuration and for type 3 CSS, UE specific SS, CORESET resource allocation of 6RB bit-map and duration 1-2 OFDM symbols for FR2 REG-bundle sizes of 2/3 RBs or 6 RBs Interleaved and non-interleaved CCE-to-REG mapping Precoder-granularity of REG-bundle size PDCCH DMRS scrambling determination TCI state(s) for a CORESET configuration 2) CSS and UE-SS configurations for unicast PDCCH transmission per BWP per cell PDCCH aggregation levels 1, 2, 4, 8, 16 UP to 3 search space sets in a slot for a | n/a |

TABLE 10-continued

| Index | Feature group | Components | Field name in TS 38.331 [2] |
|---|---|---|---|
| | | scheduled SCell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1-CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | |

In one example of UE capability 2 (hereinafter, expressed as "FG 3-2"), UE capability 2 refers to, if one monitoring location (monitoring occasion (MO)) for the common search space or the UE-specific search space exists in the slot, a capability to perform monitoring regardless of a starting symbol location of the MO, as shown in [Table 11] below. UE capability 2 may be optionally supported by the UE, and whether UE capability 2 is supported may be explicitly reported to the base station.

TABLE 11

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoringSingleOccasion |

In one example of UE capability 3 (hereinafter, expressed as FG 3-5, 3-5a, and 3-5b), UE capability 3 indicates, if multiple monitoring locations (monitoring occasions (MOs)) for the common search space or the UE-specific search space exist in the slot, a pattern of an MO that the UE is able to monitor, as shown in [Table 12a] and [Table 12b] below. The pattern of the MO may include interval X between start symbols of different MOs, and maximum symbol length Y for one MO. A combination of (X, Y) supported by the UE may be, for example, one or more among {(2, 2), (4, 3), and (7, 3)}. This UE capability is optionally supportable by the UE, and whether this capability is supported and the aforementioned combination of (X, Y) are explicitly reported to the base station.

TABLE 12a

| Index | Feature group | Components | Field name in TS 38.331 [2] |
|---|---|---|---|
| 3-5 | For type 1 CSS with | For type 1 CSS with dedicated RRC configuration, type 3 CSS, and UE-SS, | pdcch-MonitoringAnyOccasions |

TABLE 12a-continued

| Index | Feature group | Components | Field name in TS 38.331 [2] |
|---|---|---|---|
|  | dedicated RRC configuration, type 3 CSS, and UE-SS, monitoring occasion can be any OFDM symbol(s) of a slot for Case 2 | monitoring occasion can be any OFDM symbol(s) of a slot for Case 2 | {3-5. withoutDCI-Gap 3-5a. withDCI-Gap} |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as 20 FDM symbols for 15 kHz 40 FDM symbols for 30 kHz 70 FDM symbols for 60 kHz with NCP 11 OFDM symbols for 120 kHz Up to one unicast DL DCI and up to one unicast UL DCI in a monitoring occasion except for the monitoring occasions of FG 3-1. In addition for TDD the minimum separation between the first two UL unicast DCIs within the first 3 OFDM symbols of a slot can be zero OFDM symbols. |  |

TABLE 12b

| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. For the set of monitoring occasions which are within the same span: Processing one unicast DCI scheduling DL and one unicast DCI scheduling UL per scheduled CC across this set of monitoring occasions for FDD Processing one unicast DCI scheduling DL and two unicast DCI scheduling UL per scheduled CC across this set of monitoring occasions for TDD Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3-1, is no more than floor(14/X) (X is minimum among values reported by UE). The number of different start symbol indices of PDCCH monitoring occasions per slot including PDCCH monitoring occasions of FG-3-1, is no more than 7. The number of different start symbol indices of PDCCH monitoring occasions | per half-slot including PDCCH monitoring occasions of FG-3-1 is no more than 4 in SCell.

The UE may report whether aforementioned UE capability 2 and/or UE capability 3 is supported and related parameters to the base station. The base station may perform time axis resource allocation for the common search space and the UE-specific search space, based on the reported UE capability. During the resource allocation, the base station may prevent MO from being located in a location where the UE cannot perform monitoring.

[PDCCH: Blind Decoding (BD)/CCE Limit]

When multiple search space sets are configured to the UE, the following conditions may be considered for a method of determining a search space set required to be monitored by the UE.

If the UE is configured with a value of monitoringCapabilityConfig-r16, which is upper layer signaling, via r15-monitoringcapability, the UE may define, for each slot, a maximum value for the number of PDCCH candidate groups that may be monitored and for the number of CCEs constituting the entire search space (here, the entire search space may refer to all CCE sets corresponding to a union region of multiple search space sets), and if a value of monitoringCapabilityConfig-r16 is configured via r16monitorin- gcapability, the UE may define, for each span, a maximum value for the number of PDCCH candidate groups that may be monitored and for the number of CCEs constituting the entire search space (here, the entire search space may refer to all CCE sets corresponding to a union region of multiple search space sets). The monitoringCapabilityConfig-r16 may refer to configuration information of [Table 13a] and [Table 13b] below.

TABLE 13a

PDCCH-Config information element

```
-- ASN1START
-- TAG-PDCCH-CONFIG-START
PDCCH-Config ::= SEQUENCE {
    controlResourceSetToAddModList SEQUENCE(SIZE (1..3)) OF
ControlResourceSet OPTIONAL, -- Need N
    controlResourceSetToReleaseList SEQUENCE(SIZE (1..3)) OF
ControlResourceSetId OPTIONAL, -- Need N
    searchSpacesToAddModList SEQUENCE(SIZE (1..10)) OF
SearchSpace OPTIONAL, -- Need N
    searchSpacesToReleaseList SEQUENCE(SIZE (1..10)) OF
SearchSpaceId OPTIONAL, -- Need N
    downlinkpreemption SetupRelease { DownlinkPreemption }
OPTIONAL, -- Need M
    tpc-PUSCH SetupRelease { PUSCH-TPC-CommandConfig }
OPTIONAL, -- Need M
    tpc-PUCCH SetupRelease { PUCCH-TPC-CommandConfig }
OPTIONAL, -- Need M
    tpc-SRS SetupRelease { SRS-TPC-CommandConfig}
OPTIONAL, -- Need M
    ...,
    [[
    controlResourceSetToAddModList2-r16 SEQUENCE (SIZE (1..2))
OF ControlResourceSet OPTIONAL, -- Need N
    controlResourceSetToReleaseList-r16 SEQUENCE (SIZE (1..5))
OF ControlResourceSetId-R16 OPTIONAL, -- Need N
    searchSpacesToAddModListExt-r16 SEQUENCE(SIZE (1..10)) OF
SearchSpaceExt-r16 OPTIONAL, -- Need N
    uplinkCancellation-r16 SetupRelease { UplinkCancellation-r16 }
OPTIONAL, -- Need M
    monitoringCapabilityConfig-r16 ENUMERATED {
r15monitoringcapability,r16monitoringcapability } OPTIONAL, --
Need M
    searchSpaceSwitchConfig-r16 SearchSpaceSwitchConfig-r16
OPTIONAL -- Need R
    ]]
}
SearchSpaceSwitchConfig-r16 ::= SEQUENCE {
    cellGroupsForSwitchList-r16 SEQUENCE(SIZE (1..4)) OF
CellGroupForSwitch-r16 OPTIONAL, -- Need R
    searchSpaceSwitchDelay-r16 INTEGER (10..52)
    OPTIONAL -- Need R
}
CellGroupForSwitch-r16 ::= SEQUENCE(SIZE (1..16)) OF
ServCellIndex
-- TAG-PDCCH-CONFIG-STOP
-- ASN1STOP
```

TABLE 13b

PDCCH-Config field descriptions controlResourceSetToAddModList, controlResourceSetToAddModList2
List of UE specifically configured Control Resource Sets (CORESETs) to be used by the UE. The network configures at most 3 CORESETs per BWP per cell (including UE-specific and common CORESETs). The UE shall consider entries in controlResourceSetToAddModList and in controlResourceSetToAddModList2 as a single list, i.e., an entry created using controlResourceSetToAddModList can be modified using controlResourceSetToAddModList2 and vice-versa. In case network reconfigures control resource set with the same ControlResourceSetId as used for commonControlResourceSet configured via PDCCH-ConfigCommon, the configuration from PDCCH-Config always takes precedence and should not be updated by the UE based on servingCellConfigCommon.
controlResourceSetToReleaseList
List of UE specifically configured Control Resource Sets (CORESETs) to be released by the UE. This field only applies to CORESETs configured by controlResourceSetToAddModList and does not release the field commonControlResourceSet configured by PDCCH-ConfigCommon.
downlinkPreemption
Configuration of downlink preemption indications to be monitored in this cell (see TS 38.213 [13], clause 11.2).
monitoringCapabilityConfig
Configures either Rel-15 PDCCH monitoring capability or Rel-16 PDCCH monitoring capability for PDCCH monitoring on a serving cell. Value r15monitoringcapablity enables the Rel-15 monitoring capability, and value r16monitoringcapablity enables the Rel-16 PDCCH monitoring capability (see TS 38.213 [13], clause 10.1).

TABLE 13b-continued

PDCCH-Config field descriptions searchSpacesToAddModList, searchSpacesToAddModListExt
List of UE specifically configured Search Spaces. The network configures at most 10
Search Spaces per BWP per cell (including UE-specific and common Search Spaces). If
the network includes searchSpaceToAddModListExt, it includes the same number of
entries, and listed in the same order, as in searchSpacesToAddModList.
tpc-PUCCH
Enable and configure reception of group TPC commands for PUCCH.
tpc-PUSCH
Enable and configure reception of group TPC commands for PUSCH.
tpc-SRS
Enable and configure reception of group TPC commands for SRS.
uplinkCancellation
Configuration of uplink cancellation indications to be monitored in this cell (see TS
38.213 [13], clause 11.2A).

[Condition 1: Limiting the maximum number of PDCCH candidate groups]

As described above, according to a configuration value of monitoringCapabilityConfig-r16 that is upper layer signaling, $M^\mu$, which is the maximum number of PDCCH candidate groups that may be monitored by the UE, may, for example, conform to [Table 14a] below when defined based on slot, and may conform to [Table 14b] below when defined based on span, in a cell configured with a subcarrier spacing of $15 \cdot 2^\mu$ kHz.

TABLE 14a

| $\mu$ | Maximum number of PDCCH candidates per slot and per serving cell ($M^\mu$) |
|---|---|
| 0 | 44 |
| 1 | 36 |
| 2 | 22 |
| 3 | 20 |

TABLE 14b

| | Maximum number $M^\mu$ of PDCCH candidates per span for combination (X, Y) and per serving cell | | |
|---|---|---|---|
| $\mu$ | (2, 2) | (4, 3) | (7, 4) |
| 0 | 14 | 28 | 44 |
| 1 | 12 | 24 | 36 |

[Condition 2: Limiting the maximum number of CCEs]

As described above, according to a configuration value of monitoringCapabilityConfig-r16 that is upper layer signaling, $C^\mu$, which is the maximum number of CCEs constituting the entire search space (here, the entire search space may refer to all CCE sets corresponding to a union region of multiple search space sets), may, for example, conform to [Table 15a] below when defined based on slot, and may conform to [Table 15b] below when defined based on span, in a cell configured with a subcarrier spacing of $15 \cdot 2^\mu$ kHz.

TABLE 15a

| $\mu$ | Maximum number of non-overlapped CCEs per slot and per serving cell ($C^\mu$) |
|---|---|
| 0 | 56 |
| 1 | 56 |
| 2 | 48 |
| 3 | 32 |

TABLE 15b

| | Maximum number $C^\mu$ of non-overlapped CCEs per span for combination (X, Y) and per serving cell | | |
|---|---|---|---|
| $\mu$ | (2, 2) | (4, 3) | (7, 4) |
| 0 | 18 | 36 | 56 |
| 1 | 18 | 36 | 56 |

For the convenience of description, a situation in which both conditions 1 and 2 are satisfied at a specific point in time is defined as "condition A." Therefore, not satisfying condition A may refer to not satisfying at least one of conditions 1 and 2.

[Pdcch: Overbooking]

According to configurations of the search space sets from the base station, a case in which condition A is not satisfied at a specific time point may occur. If condition A is not satisfied at a specific time point, the UE may select and monitor only some of search space sets configured to satisfy condition A at the corresponding time point, and the base station may transmit PDCCH in the selected search space sets.

A method of selecting some search spaces from among all the configured search space sets may conform to the following method.

If condition A for PDCCH is not satisfied at a specific time point (slot), the UE (or base station) may select a search space set, in which a search space type is configured to be a common search space, preferentially over a search space set configured to be a UE-specific search space, from among search space sets existing at the corresponding time point.

If all the search space sets configured to be the common search space are selected (that is, if condition A is satisfied even after all the search spaces configured to be the common search space are selected), the UE (or base station) may select the search space sets configured to be the UE-specific search space. If there are multiple search space sets configured to be the UE-specific search spaces, a search space set having a low search space set index may have a higher priority. The UE (or base station) may select, in consideration of priority, UE-specific search space sets within a range in which condition A is satisfied.

[QCL, TCI State]

In the wireless communication system, one or more different antenna ports may be associated with each other by a quasi-co-location (QCL) configuration as shown in [Table 16] below, wherein the different antenna ports can be replaced with one or more channels, signals, and combinations thereof, but in the description of the disclosure below, for convenience, different antenna ports are collectively referred to. A TCI state is for announcing/indicating a QCL relationship between PDCCH (or PDCCH DMRS) and another RS or channel, and certain reference antenna port A (reference RS #A) and another target antenna port B (target RS #B) being QCLed to each other indicates that the UE is allowed to apply some or all of large-scale channel parameters estimated at antenna port A to channel measurement from antenna port B. QCL may need to associate different parameters depending on situations, such as 1) time tracking affected by an average delay and a delay spread, 2) frequency tracking affected by a Doppler shift and a Doppler spread, 3) radio resource management (RRM) affected by an average gain, and 4) beam management (BM) affected by a spatial parameter. Accordingly, NR supports four types of QCL relationships as shown in [Table 16] below.

TABLE 16

| QCL type | Large-scale characteristics |
| --- | --- |
| A | Doppler shift, Doppler spread, average delay, delay spread |
| B | Doppler shift, Doppler spread |
| C | Doppler shift, average delay |
| D | Spatial Rx parameter |

The spatial RX parameter may refer to some or all of various parameters, such as angle of arrival (AoA), power angular spectrum (PAS) of AoA, angle of departure (AoD), PAS of AoD, transmission/reception channel correlation, transmission/reception beamforming, and spatial channel correlation.

The QCL relationship is configurable to the UE via RRC parameter TCI-State and QCL-Info as shown in [Table 17] below. Referring to [Table 17] below, the base station may configure one or more TCT states to the UE so as to inform an RS referring to an ID of the TCI state, that is, up to two QCL relationships (qcl-Type1 and qcl-Type2) for a target RS. Each piece of QCL information (QCL-Info) included in each TCI state includes a serving cell index and a BWP index of a reference RS indicated by the corresponding QCL information, a type and an ID of the reference RS, and a QCL type as shown in [Table 16].

TABLE 17

```
    TCI-State ::=              SEQUENCE {
    tci-StateId                TCI-StateId,
    (ID of corresponding TCI state)
    qcl-Type1                  QCL-Info,
    (QCL information of first reference RS of RS (target RS)
referring to corresponding TCI state ID)
    qcl-Type2                  QCL-Info
    OPTIONAL,  -- Need R
    (QCL information of second reference RS of RS (target RS)
referring to corresponding TCI state ID)
    ...
    }
    QCL-Info ::=               SEQUENCE {
    cell                       ServCellIndex    OPTIONAL,
    -- Need R
    (serving cell index of reference RS indicated by corresponding
QCL information)
    bwp-Id                     BWP-Id
    OPTIONAL, -- Cond CSI-RS-Indicated
    (BWP index of reference RS indicated by corresponding QCL
information)
    reference Signal           CHOICE {
    csi-rs                     NZP-CSI-RS-ResourceId,
    ssb                        SSB-Index
```

TABLE 17-continued

```
    (either CSI-RS ID or SSB ID indicated by corresponding QCL
information)
    },
    qcl-Type                   ENUMERATED {typeA, typeB,
typeC, typeD},
    ...
}
```

Figure 7:
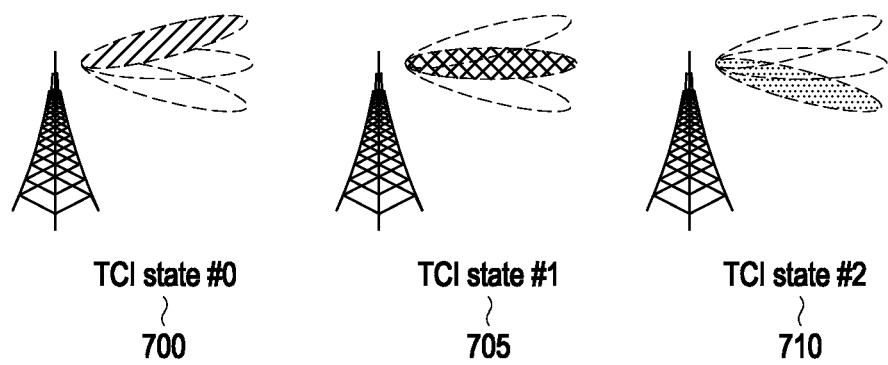
FIG. 7 is a diagram illustrating an example of base station beam assignment according to a TCI state configuration in the wireless communication system according to an embodiment of the disclosure.

FIG. 7 is a diagram illustrating an example of base station beam assignment according to a TCI state configuration.

Referring to FIG. 7, a base station may transfer information on N different beams to a UE via N different TCI states. For example, when N=3 as shown in FIG. 7, the base station may cause the qcl-Type2 parameters included in three TCI states 700, 705, and 710 to be associated with CSI-RSs or SSBs corresponding to different beams and to be configured to QCL type D, so as to announce/indicate that antenna ports referring to the different TCI states 700, 705, or 710 are associated with different spatial Rx parameters, i.e., different beams.

[Table 18a] to [Table 18e] below show valid TCI state configurations according to a target antenna port type.

[Table 18a] below shows a valid TCI state configuration when the target antenna port is a CSI-RS for tracking (TRS). The TRS refers to a non-zero-power (NZP) CSI-RS, in which a repetition parameter is not configured and trs-Info is configured to true in configuration information illustrated in [Table 19a] and [Table 19b] below, from among CSI-RSs. Configuration 3 in [Table 18a] may be used for aperiodic TRS.

TABLE 18a

Valid TCI state configuration when target antenna port is CSI-RS for tracking (TRS).

| Valid TCI State Configuration | DL RS1 | qcl-Type1 | DL RS2 (if configured) | qcl-Type2 (if configured) |
| --- | --- | --- | --- | --- |
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS1) | QCL-TypeD |

[Table 18b] below shows a valid TCI state configuration when the target antenna port is a CSI-RS for CSI. The CSI-RS for CSI refers to an NZP CSI-RS, in which a parameter (e.g., repetition parameter) indicating repetition is not configured and trs-Info is not configured to true either, from among CSI-RSs.

TABLE 18b

Valid TCI state configuration when target antenna port is CSI-RS for CSI.

| Valid TCI State Configuration | DL RS1 | qcl-Type1 | DL RS2 (if configured) | qcl-Type2 (if configured) |
| --- | --- | --- | --- | --- |
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS1) | QCL-TypeD |
| 4 | TRS | QCL-TypeB | | |

[Table 18c] below shows a valid TCI state configuration when the target antenna port is CSI-RS for beam management (BM) (same meaning as CSI-RS for L1 reference signal received power (RSRP) reporting). The CSI-RS for BM refers to an NZP CSI-RS, in which a repetition parameter is configured so as to have a value of On or Off, and trs-Info is not configured to true, from among CSI-RSs.

TABLE 18c

Valid TCI state configuration when target antenna port is CSI-RS for BM (for L1 RSRP reporting)

| Valid TCI State Configuration | DL RS1 | qcl-Type1 | DL RS2 (if configured) | qcl-Type2 (if configured) |
|---|---|---|---|---|
| 1 | TRS | QCL-TypeA | TRS (same as DL RS1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

[Table 18d] below shows a valid TCI state configuration when the target antenna port is a PDCCH DMRS.

TABLE 18d

Valid TCI state configuration when target antenna port is PDCCH DMRS.

| Valid TCI State Configuration | DL RS1 | qcl-Type1 | DL RS2 (if configured) | qcl-Type2 (if configured) |
|---|---|---|---|---|
| 1 | TRS | QCL-TypeA | TRS (same as DL RS1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS1) | QCL-TypeD |

[Table 18e] below shows a valid TCI state configuration when the target antenna port is a PDSCH DMRS.

TABLE 18e

Valid TCI state configuration when target antenna port is PDSCH DMRS.

| Valid TCI State Configuration | DL RS1 | qcl-Type1 | DL RS2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (BM) | QCL-TypeD |

A representative QCL configuration method by [Table 18a] to [Table 18e] includes configuring and operating a target antenna port and a reference antenna port for each operation as "SSB"→"TRS"→"CSI-RS for CSI, CSI-RS for BM, PDCCH DMRS, or PDSCH DMRS." Based on this, it is possible to assist a reception operation of the UE by linking, to respective antenna ports, statistical characteristics measurable from SSB and TRS.

[Table 19a] and [Table 19b] below may be referred to for configuration information of trs-Info related to the NZP CSI-RS.

TABLE 19a

NZP-CSI-RS-ResourceSet information element

```
-- ASN1START
-- TAG-NZP-CSI-RS-RESOURCESET-START
NZP-CSI-RS-ResourceSet ::=          SEQUENCE {
   nzp-CSI-ResourceSetId            NZP-CSI-RS-ResourceSetId,
   nzp-CSI-RS-Resources             SEQUENCE (SIZE
(1..maxNrofNZP-CSI-RS-ResourcesPerSet)) OF NZP-CSI-RS-ResourceId,
   repetition                       ENUMERATED { on, off }
OPTIONAL,    -- Need S
   aperiodicTriggeringOffset        INTEGER(0..6)
OPTIONAL,    -- Need S
   trs-Info                         ENUMERATED {true}
OPTIONAL,    -- Need R
   ....
   [[
   aperiodicTriggeringOffset-r16    INTEGER(0..31)
OPTIONAL    -- Need S
   ]]
}
-- TAG-NZP-CSI-RS-RESOURCESET-STOP
-- ASN1STOP
```

TABLE 19b

NZP-CSI-RS-ResourceSet field descriptions aperiodicTriggeringOffset, aperiodicTriggeringOffset-r16
Offset X between the slot containing the DCI that triggers a set of aperiodic NZP CSI-RS resources and the slot in which the CSI-RS resource set is transmitted. For aperiodicTriggeringOffset, the value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. For aperiodicTriggeringOffset-r16, the value indicates the number of slots. The network configures only one of the fields. When neither field is included, the UE applies the value 0.
nzp-CSI-RS-Resources
NZP-CSI-RS-Resources associated with this NZP-CSI-RS resource set (see TS 38.214 [19], clause 5.2). For CSI, there are at most 8 NZP CSI RS resources per resource set.
repetition
Indicates whether repetition is on/off. If the field is set to off or if the field is absent, the UE may not assume that the NZP-CSI-RS resources within the resource set are transmitted with the same downlink spatial domain transmission filter (see TS 38.214 [19], clauses 5.2.2.3.1 and 5.1.6.1.2). It can only be configured for CSI-RS resource sets which are associated with CSI-ReportConfig with report of L1 RSRP or "no report."
trs-Info

TABLE 19b-continued

NZP-CSI-RS-ResourceSet field descriptions

Indicates that the antenna port for all NZP-CSI-RS resources in the CSI-RS resource set is same. If the field is absent or released the UE applies the value false (see TS 38.214 [19], clause 5.2.2.3.1).

[PDCCH: related to TCI state]

Specifically, TCI state combinations applicable to a PDCCH DMRS antenna port are as shown in [Table 20] below. In [Table 20], a fourth row is a combination assumed by the UE before RRC configuration and cannot be configured after the RRC configuration.

TABLE 20

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
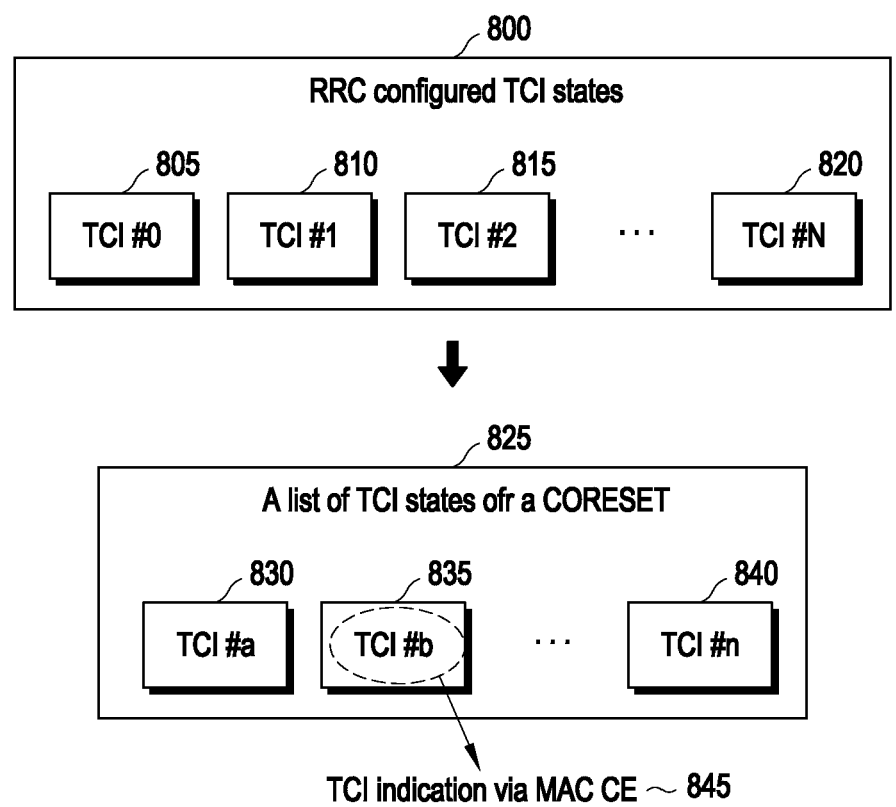
FIG. 8 is a diagram illustrating an example of a TCI state assignment method for PDCCH in the wireless communication system according to an embodiment of the disclosure.

In NR, a hierarchical signaling method as shown in FIG. 8 is supported for dynamic assignment of a PDCCH beam.

FIG. 8 is a diagram illustrating an example of a TCI state assignment method for PDCCH in the wireless communication system according to an embodiment of the disclosure.

Referring to FIG. 8, a base station may configure 825 multiple TCI states 805, 810, . . . , 820 to a UE via RRC signaling 800, and some of the TCI states may be configured as TCI states for CORESET. The base station may then indicate 845 one of the TCI states 830, 835, . . . , 840 for CORESET to the UE via MAC control element (MAC CE) signaling. Thereafter, the UE receives PDCCH, based on beam information included in the TCI state indicated by the MAC CE signaling.

Figure 9:
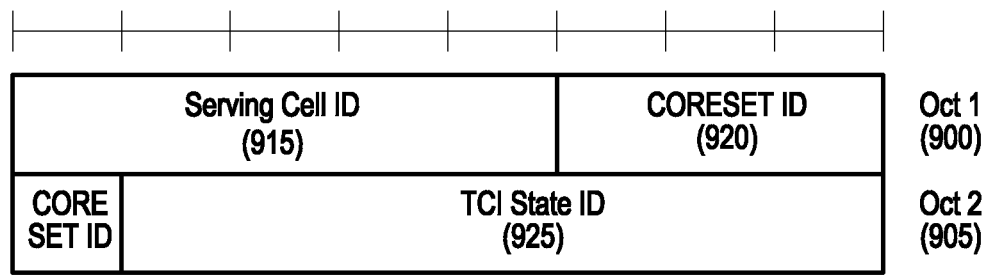
FIG. 9 is a diagram illustrating a TCI indication MAC CE signaling structure for a PDCCH DMRS in the wireless communication system according to an embodiment of the disclosure.

FIG. 9 is a diagram illustrating a TCI indication MAC CE signaling structure for a PDCCH DMRS in the wireless communication system according to an embodiment of the disclosure.

Referring to FIG. 9, TCI indication MAC CE signaling for the PDCCH DMRS is configured by, for example, 2 bytes (16 bits) (Oct1 900 and Oct2 905), and includes a 5-bit serving cell ID 915, a 4-bit CORESET ID 920, and a 7-bit TCI state ID 925.

Figure 10:
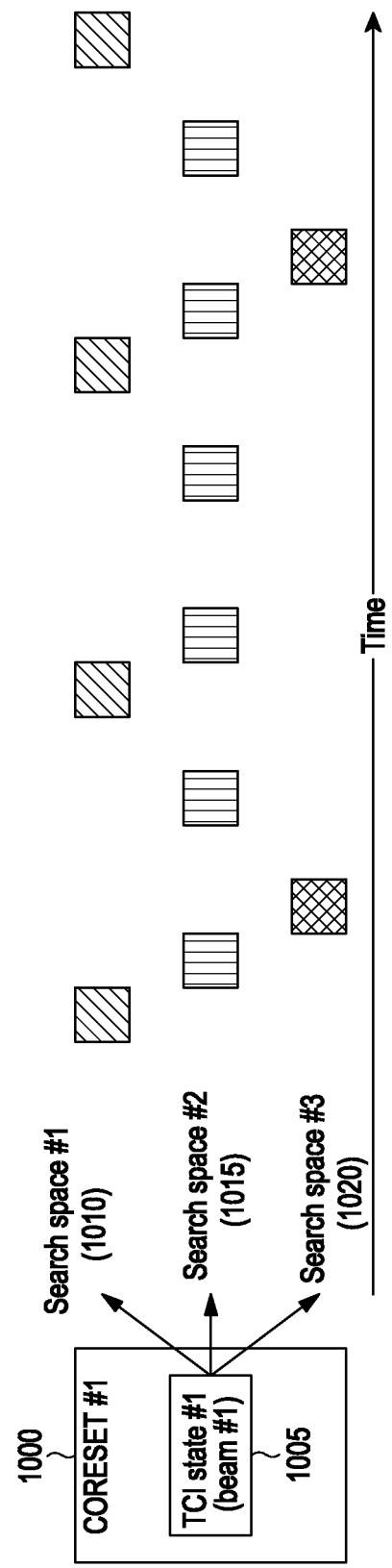
FIG. 10 is a diagram illustrating an example of a CORE-SET and a search space beam configuration in the wireless communication system according to an embodiment of the disclosure.

FIG. 10 is a diagram illustrating an example of a CORESET and a search space beam configuration in the wireless communication system according to an embodiment of the disclosure.

Referring to FIG. 10, a base station may indicate 1005, to a UE, one of TCI state lists included in a CORESET 1000 configuration via MAC CE signaling. Then, until another TCI state is indicated to a corresponding CORESET via another MAC CE signaling from the base station, the UE considers that the same QCL information (beam #1) 1005 is applied to, for example, all of one or more search spaces #1, #2, and #3 1010, 1015, and 1020 connected to the CORESET. In the aforementioned PDCCH beam assignment method, it is difficult to indicate a beam change faster than a MAC CE signaling delay, and since the same beam is collectively applied to all CORESETs regardless of search space characteristics, flexible PDCCH beam operation may be difficult.

Hereinafter, embodiments of the disclosure provide a more flexible PDCCH beam configuration and operation method. In describing embodiments of the disclosure, several distinct examples are provided for convenience of description, but the illustrated embodiments are not mutually exclusive, and two or more embodiments may be applied by appropriately combining with each other according to circumstances.

The base station may configure one or multiple TCI states to the UE with respect to a specific control resource set, and may activate one of the configured TCI states via a MAC CE activation command. For example, {TCI state #0, TCI state #1, TCI state #2} may be configured as TCI states for control resource set #1, and the base station may transmit, to the UE via the MAC CE, a command for activating to assume TCI state #0 as the TCI state for control resource set #1. The UE may correctly receive a DMRS of the corresponding control resource set on the basis of QCL information within the activated TCI state, based on the activation command for the TCI state, which has been received via the MAC CE.

With respect to a control resource set (control resource set #0) the index of which is configured to 0, if the UE has failed to receive the MAC CE activation command for the TCI state of control resource set #0, the UE may assume (QCL assumption) that a DMRS transmitted in control resource set #0 has been QCLed with an SS/PBCH block (SSB) identified during an initial access or a non-contention-based random access that is not triggered by a PDCCH command.

With respect to a control resource set (control resource set #X) the index of which is configured to a value other than 0, if the UE has failed to be configured with a TCI state for control resource set #X, or has received one or more TCI states but has failed to receive the MAC CE activation command to activate one of the received TCI states, the UE may assume (QCL assumption) that a DMRS transmitted in control resource set #X has been QCLed with the SS/PBCH block (SSB) identified during the initial access.

[PDSCH: Related to Frequency Resource Allocation]

Figure 11:
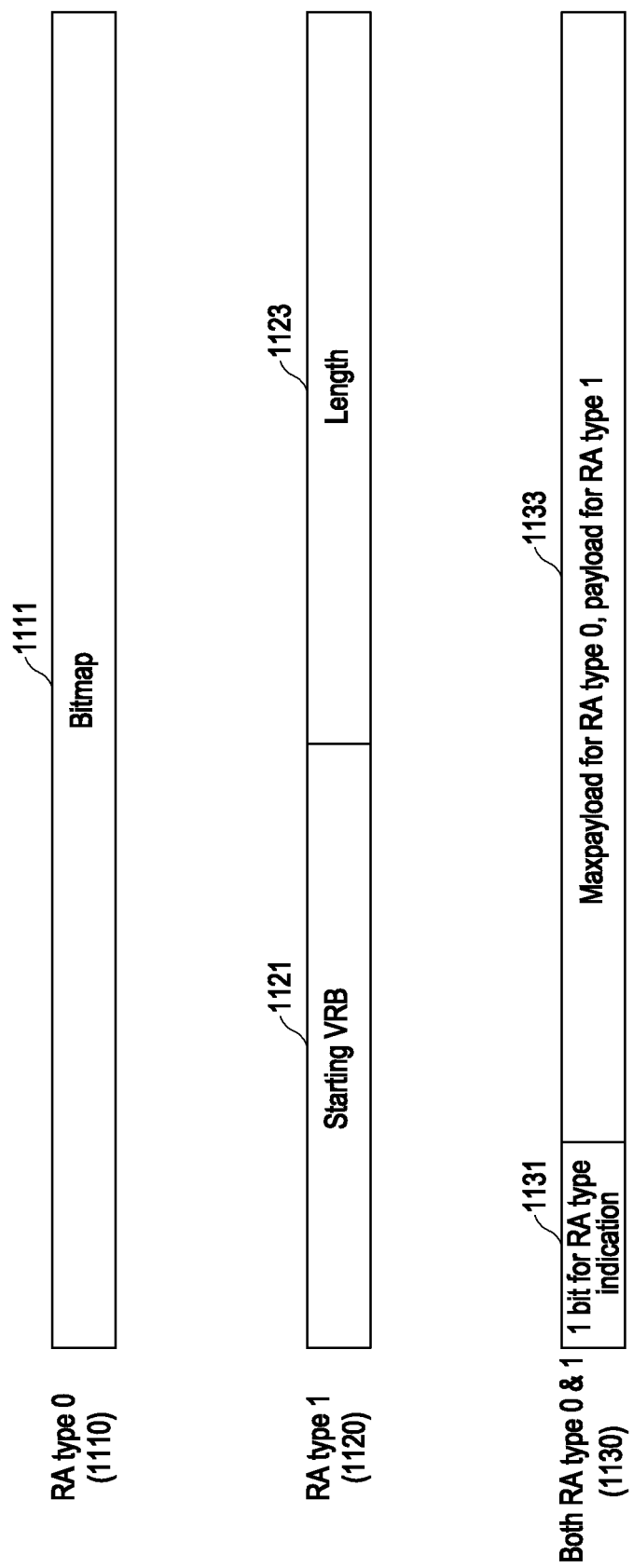
FIG. 11 is a diagram illustrating an example of frequency axis resource allocation of PDSCH in the wireless communication system according to an embodiment of the disclosure.

FIG. 11 is a diagram illustrating an example of frequency domain resource allocation of a physical downlink shared channel (PDSCH) in the wireless communication system according to an embodiment of the disclosure.

FIG. 11 illustrates three frequency axis resource allocation methods of resource allocation (RA) type 0 1110, RA type 1 1120, and a dynamic switch of resource allocation (RA type 0 and RA type 1) 1130 configurable via an upper layer in the NR wireless communication system.

Referring to FIG. 11, if the UE is configured, upper layer signaling, to use only RA type 0 1110, a part of downlink control information (DCI) for assigning PDSCH to the UE includes, for example, a bitmap 1111 including NRBG bits. Conditions for this will be described later. In this case, NRBG refers to the number of resource block groups (RBGs) determined, as shown in [Table 21] below, according to rbg-Size, which is an upper layer parameter, and a BWP size allocated by a BWP indicator, and data is transmitted on RBG indicated by number 1 via the bitmap.

TABLE 21

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the UE is configured, via upper layer signaling, to use only RA type 1 1120, a part of DCI for assigning PDSCH to the UE includes frequency axis resource allocation information including bits. The $\lceil \log_2(N_{RB}^{DL,BWP}(N_{RB}^{DL,BWP}+1)/2) \rceil$ bits. The $N_{RB}^{DL,BWP}$ is the number of RBs in a downlink bandwidth part (BWP). Conditions for this will be described later. Based on this, the base station may configure a starting virtual resource block (VRB) 1121 and a length 1123 of a frequency domain resource continuously allocated therefrom.

If the UE is configured, via upper layer signaling, to use both RA type 0 and RA type 1 as in 1130, a part of DCI for allocating PDSCH to the UE includes frequency domain resource allocation (FDRA) information including bits of a larger value 1133 among payloads 1121 and 1123 for configuring RA type 1 1120 and a payload 1111 for configuring RA type 0 1110. Conditions for this will be described later. In this case, one bit 1131 may be added to a first part (MSB) of frequency domain resource allocation information in DCI so as to indicate use of RA type 0 or RA type 1. For example, if a value of the bit 1131 is "0," use of RA type 0 may be indicated, and if the value is "1," use of RA type 1 may be indicated.

[Relating to PDSCH Time Resource Allocation]

Hereinafter, a time domain resource allocation (TDRA) method for a data channel in a next-generation mobile communication system (5G or NR system) will be described.

The base station may configure, to the UE via upper layer signaling (e.g., RRC signaling), a table for time domain resource allocation information on a downlink data channel (physical downlink shared channel (PDSCH)) and an uplink data channel (physical uplink shared channel (PUSCH)). A table including up to 16 entries (maxNrofDL-Allocations=16) may be configured for PDSCH, and a table including up to 16 entries (maxNrofUL-Allocations=16) may be configured for the PUSCH. In an embodiment, the time domain resource allocation information may include a PDCCH-to-PDSCH slot timing (indicated as K0, and corresponding to a time interval of a slot unit between a point in time when PDCCH is received and a point in time when PDSCH scheduled by received PDCCH is transmitted), a PDCCH-to-PUSCH slot timing (indicated as K2, and corresponding to a time interval of a slot unit between a point in time when PDCCH is received and a point in time when PUSCH scheduled by received PDCCH is transmitted), information on a location and length of a start symbol in which PDSCH or PUSCH is scheduled within a slot, a mapping type of PDSCH or the PUSCH, and the like. For example, information as shown in [Table 22] or [Table 23] below may be transmitted from the base station to the UE.

TABLE 22

PDSCH-TimeDomainResourceAllocationList information element

```
-- ASN1START
-- TAG-PDSCH-TIMEDOMAINRESOURCEALLOCATIONLIST-START
PDSCH-TimeDomainResourceAllocationList    ::=    SEQUENCE
(SIZE(1..maxNrofDL-Allocations)) OF PDSCH-TimeDomainResourceAllocation
PDSCH-TimeDomainResourceAllocation : :=    SEQUENCE {
    k0                                    INTEGER(0..32)
OPTIONAL,   -- Need S
    mappingType                           ENUMERATED {typeA,
typeB},
    startSymbolAndLength                  INTEGER (0..127)
}
```

TABLE 23

PUSCH-TimeDomainResourceAllocation information element

```
-- ASN1START
-- TAG-PUSCH-TIMEDOMAINRESOURCEALLOCATIONLIST-START
PUSCH-TimeDomainResourceAllocationList    ::=    SEQUENCE
(SIZE(1..maxNrofUL-Allocations)) OF PUSCH-TimeDomainResourceAllocation
PUSCH-TimeDomainResourceAllocation ::=    SEQUENCE {
    k2                                    INTEGER(0..32)
OPTIONAL,   -- Need S
    mappingType                           ENUMERATED {typeA,
typeB},
    startSymbolAndLength                  INTEGER (0..127)
}
```

The base station may notify one of the entries of [Table 22] and [Table 23] of the time domain resource allocation information to the UE via L1 signaling (e.g., DCI) (e.g., the entry may be indicated by a "time domain resource allocation" field in DCI). The UE may acquire the time domain resource allocation information for PDSCH or PUSCH, based on DCI received from the base station.

Figure 12:
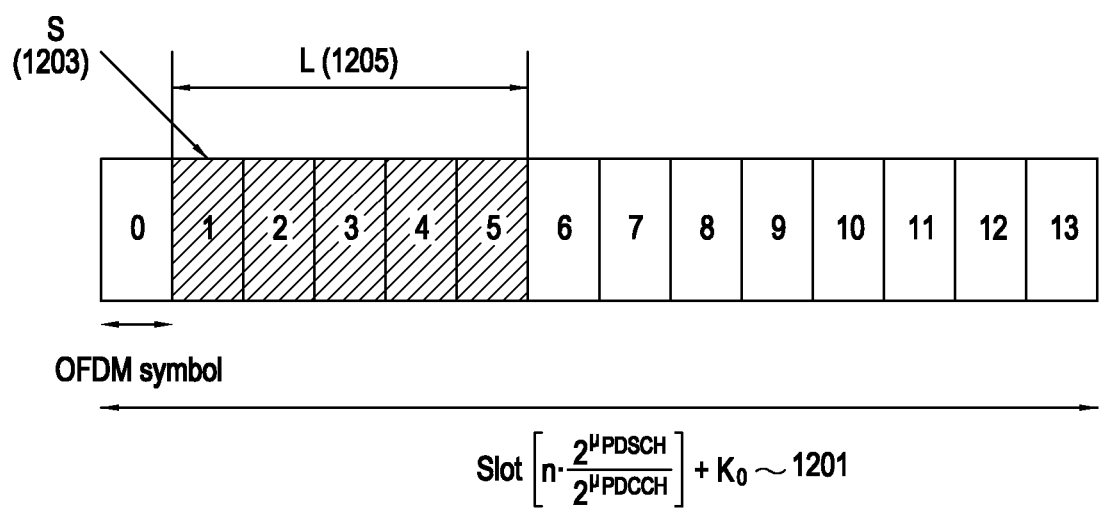
FIG. 12 is a diagram illustrating an example of time axis resource allocation of a PDSCH in the wireless communication system according to an embodiment of the disclosure.

FIG. 12 is a diagram illustrating an example of time domain resource allocation of PDSCH in the wireless communication system according to an embodiment of the disclosure.

Referring to FIG. 12, a base station may indicate a time domain location of a PDSCH resource according to subcarrier spacings (SCS) (μPDSCH and μPDCCH) of a data channel and a control channel configured using upper layer signaling, a scheduling offset (KO) value, and an OFDM symbol start location (S) 1203 and length (L) 1205 in one slot 1201 dynamically indicated via DCI.

Figure 13:
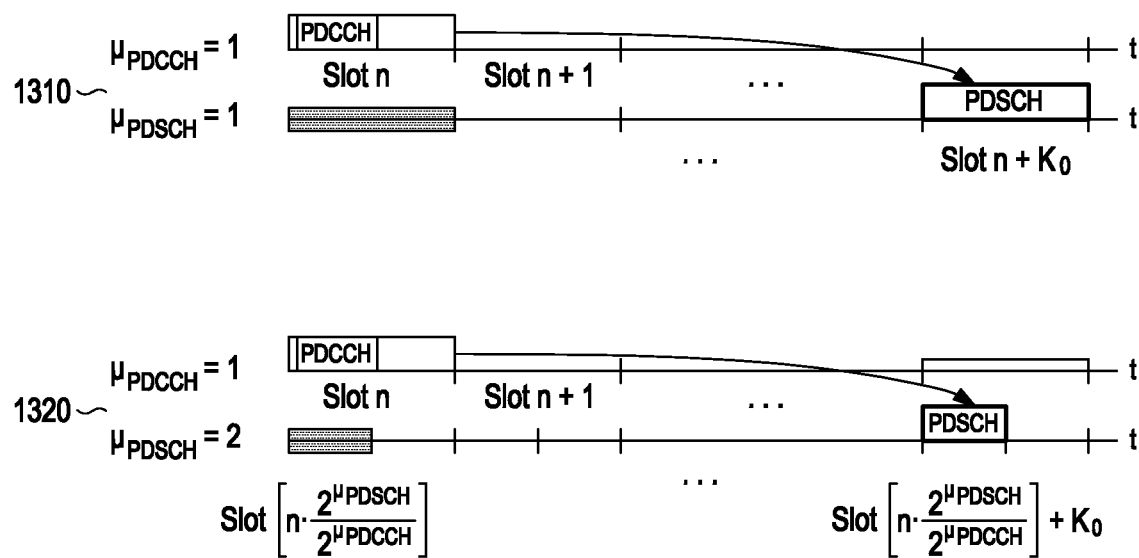
FIG. 13 is a diagram illustrating an example of time axis resource allocation according to subcarrier spacings of a data channel and a control channel in the wireless communication system according to an embodiment of the disclosure.

FIG. 13 is a diagram illustrating an example of time domain resource allocation according to subcarrier spacings of a data channel and a control channel in the wireless communication system according to an embodiment of the disclosure.

Referring to FIG. 13, if subcarrier spacings (SCS) (μPDSCH and μPDCCH) of a data channel and a control channel are the same 1310 (μPDSCH=μPDCCH), slot numbers for data and control are the same, and thus a base station and a UE may generate a scheduling offset according to a predetermined slot offset KO. On the other hand, if the subcarrier spacings (SCS) (μPDSCH and μPDCCH) of the data channel and the control channel are different 1320 (gDSCH μPDCCH), the slot numbers for data and control are different, and thus the base station and the UE may generate a scheduling offset according to a predetermined slot offset KO, based on the subcarrier spacing of PDCCH. For example, if the UE has received DCI indicating a bandwidth part change in slot n, and the slot offset value indicated by the DCI is KO, data may be received in PDSCH scheduled in slot n+KO.

[Relating to UE Capability Reporting]

In LTE and NR systems, in a state where a UE is connected to a serving base station, the UE may perform a procedure of reporting a capability supported thereby to the base station. In the description below, this is referred to as a UE capability report.

The base station may transfer, to the connected UE, a UE capability enquiry message for requesting a capability report. The message may include a UE capability request for each radio access technology (RAT) type of the base station. The request for each RAT type may include supported frequency band combination information and the like. In a case of the UE capability enquiry message, UE capability may be requested for multiple RAT types via a container of a single RRC message transmitted by the base station, or the base station may include multiple UE capability enquiry messages including the UE capability request for each RAT type so as to transfer the same to the UE. That is, the UE capability enquiry is repeated multiple times within one message, and the UE may configure a corresponding UE capability information message and report the same multiple times. In the next-generation mobile communication system, a UE capability request for multi-RAT dual connectivity (MR-DC) including NR, LTE, and E-UTRA-NR dual connectivity (EN-DC) may be made. The UE capability enquiry message is generally transmitted initially after the UE is connected to the base station, but the base station may request a UE capability report under any conditions when necessary.

As described above, the UE having received, from the base station, a request for a UE capability report configures a UE capability according to RAT type and band information requested from the base station. Examples of a method for configuring a UE capability by the UE in the NR system are as follows.

1. If a UE receives a list of LTE and/or NR bands via a request for UE capability from a base station, the UE configures a band combination (BC) for EN-DC and NR stand-alone (SA). That is, the UE configures a candidate list of BCs for EN-DC and NR SA, based on the bands requested by the base station via FreqBandList. The bands have priorities in the order described in FreqBandList.

2. If the base station sets an "eutra-nr-only" flag or an "eutra" flag within the UE capability enquiry message so as to request a UE capability report, the UE completely removes NR SA BCs from the configured candidate list of BCs. This may occur only when the LTE base station (eNB) requests "eutra" capability.

3. Afterwards, the UE removes fallback BCs from the configured BC candidate list. Here, the fallback BC refers to a BC obtainable by removing a band corresponding to at least one SCell from any BC, and since a BC before removing the band corresponding to at least one SCell is able to already cover the fallback BC, this can be omitted. This operation is also applied to MR-DC, i.e., LTE bands. The remaining BCs after this operation constitute a final "candidate BC list."

4. The UE selects BCs to be reported by selecting BCs conforming to a requested RAT type from the final "candidate BC list." In this operation, the UE configures supportedBandCombinationList in a predetermined order. That is, the UE configures the BCs and UE capability to be reported according to a preconfigured rat-Type order (nr→eutra-nr→eutra). The UE configures featureSetCombination for configured supportedBandCombinationList and configures a list of "candidate feature set combination" from the candidate BC list from which the list of fallback BCs (including equal or lower level capabilities) has been removed. The "candidate feature set combination" may include feature set combinations for both NR and EUTRA-NR BC, and may be obtained from feature set combinations of UE-NR-capabilities and UE-MRDC-capabilities containers.

5. If the requested RAT type is eutra-nr and has affects, featureSetCombinations is included in both of two containers of UE-MRDC-Capabilities and UE-NR-Capabilities. However, the feature set of NR is included only in UE-NR-Capabilities.

After the UE capability is configured, the UE transfers a UE capability information message including the UE capability to the base station in operation. The base station performs appropriate scheduling and transmission or reception management with respect to the corresponding UE at a later time, based on the UE capability received from the UE.

[Relating to CA/DC]

Figure 14:
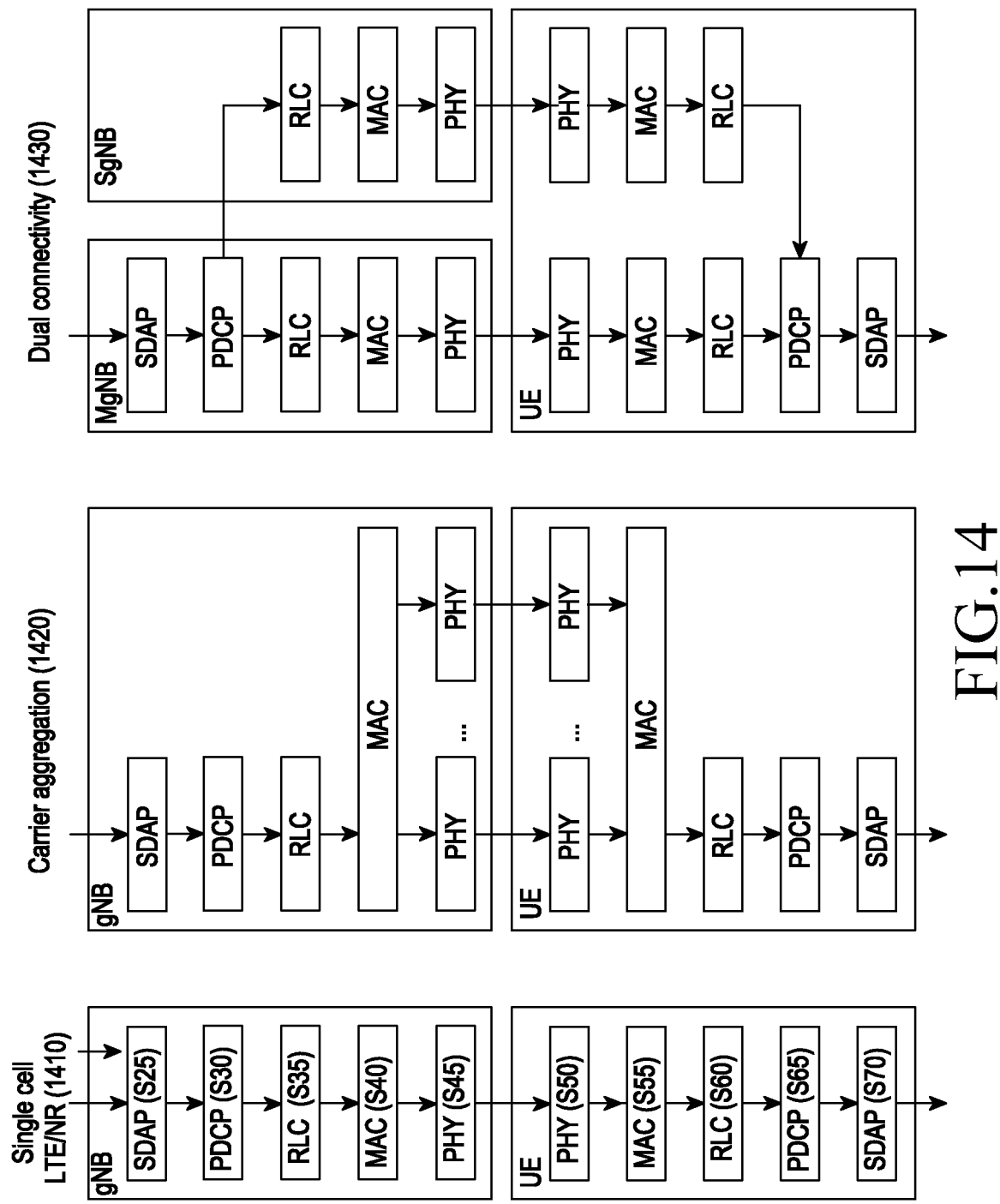
FIG. 14 is a diagram illustrating radio protocol structures of a UE and a base station in single cell, carrier aggregation, and dual connectivity situations in the wireless communication system according to an embodiment of the disclosure.

FIG. 14 is a diagram illustrating a radio protocol structure of a base station and a UE in a single cell 1410, carrier aggregation 1420, and dual connectivity 1430 situations according to an embodiment of the disclosure.

Referring to FIG. 14, radio protocols of a next-generation mobile communication system include NR service data adaptation protocols (SDAP) S25 and S70, NR packet data convergence protocols (PDCP) S30 and S65, NR radio link controls (RLC) S35 and S60, and NR medium access controls (MAC) S40 and S55 layers, in a UE and an NR base station respectively. In the following description, each layer device may be understood as a functional block in charge of a corresponding layer.

Main functions of the NR SDAPs S25 and S70 may include some of the following functions:
- user data transfer function (transfer of user plane data);
- function of mapping QoS flow and data bearer for uplink and downlink (mapping between a QoS flow and a DRB for both DL and UL);
- function of marking QoS flow ID in uplink and downlink (marking QoS flow ID in both DL and UL packets); and/or
- function of mapping reflective QoS flow to data bearer for uplink SDAP PDUs (reflective QoS flow to DRB mapping for the UL SDAP PDUs).

With respect to an SDAP layer device, the UE may be configured, via an RRC message, whether to use a header of the SDAP layer device or whether to use a function of the SDAP layer device for each PDCP layer device, for each bearer, or for each logical channel, and if the SDAP header is configured, a NAS QoS reflection configuration 1-bit indicator (NAS reflective QoS) and an AS QoS reflection configuration 1-bit indicator (AS reflective QoS) in the SDAP header may indicate the UE to update or reconfigure mapping information for data bearers and QoS flows in uplink and downlink. The SDAP header may include QoS flow ID information indicating QoS. The QoS information may be used as a data processing priority, scheduling information, etc. to support a smooth service.

Main functions of the NR PDCPs 10-30 and 10-65 may include some of the following functions:
- header compression and decompression function (header compression and decompression: ROHC only);
- user data transmission function (transfer of user data);
- in-sequence delivery function (in-sequence delivery of upper layer PDUs);
- out-of-sequence delivery function (out-of-sequence delivery of upper layer PDUs);
- reordering function (PDCP PDU reordering for reception);
- duplicate detection function (duplicate detection of lower layer SDUs);
- retransmission function (retransmission of PDCP SDUs);
- encryption and decryption function (ciphering and deciphering); and/or
- timer-based SDU delete function (timer-based SDU discard in uplink).

The NR PDCP reordering function refers to a function of reordering PDCP PDUs received from a lower layer, in sequence based on a PDCP sequence number (SN), and may include a function of transferring data to an upper layer according to the reordered sequence. Alternatively, the NR PDCP reordering function may include a function of direct transfer without considering a sequence, may include a function of reordering the sequence to record lost PDCP PDUs, may include a function of reporting states of the lost PDCP PDUs to a transmission side, and may include a function of requesting retransmission of the lost PDCP PDUs.

Main functions of the NR RLCs S35 and S60 may include some of the following functions:
- data transmission function (transfer of upper layer PDUs);
- in-sequence delivery function (in-sequence delivery of upper layer PDUs);
- out-of-sequence delivery function (out-of-sequence delivery of upper layer PDUs);
- ARQ function (error correction through ARQ);
- concatenation, segmentation, and reassembly function (concatenation, segmentation, and reassembly of RLC SDUs);
- re-segmentation function (re-segmentation of RLC data PDUs);
- reordering function (reordering of RLC data PDUs);
- duplicate detection function (duplicate detection);
- error detection function (protocol error detection);
- RLC SDU discard function (RLC SDU discard); and/or
- RLC re-establishment function (RLC re-establishment).

The in-sequence delivery function of NR RLC may refer to a function of sequentially transferring, to an upper layer, RLC SDUs received from a lower layer. The in-sequence delivery function of the NR RLC may include a function of, when originally one RLC SDU is segmented into multiple RLC SDUs and then received, reassembling and transferring the same, may include a function of reordering the received RLC PDUs according to an RLC sequence number (SN) or a PDCP sequence number (SN), may include a function of reordering a sequence and recording lost RLC PDUs, may include a function of reporting states of the lost RLC PDUs to a transmission side, and may include a function of requesting retransmission of the lost RLC PDUs. The in-sequence delivery function of the NR RLC may include a function of, when there is a lost RLC SDU, sequentially transferring only RLC SDUs before the lost RLC SDU to the upper layer, or may include a function of sequentially transferring all the received RLC SDUs to the upper layer before a predetermined timer starts if the timer expires even if there is the lost RLC SDU. Alternatively, the in-sequence delivery function of the NR RLC device may include a function of sequentially transferring all the RLC SDUs received up to the current time to the upper layer if the predetermined timer expires even if there is the lost RLC SDU. The RLC PDUs may be processed in the order of reception thereof (in order of arrival regardless of the order of the sequence numbers or serial numbers) and may be transferred to the PDCP device regardless of the order (out-of-sequence delivery). In a case of segments, segments stored in a buffer or to be received at a later time may be received, reconfigured into one complete RLC PDU, processed, and then may be transferred to the PDCP device. The NR RLC layer may not include a concatenation function, and the function may be performed in an NR MAC layer or may be replace with a multiplexing function of the NR MAC layer.

The out-of-sequence delivery function of the NR RLC device refers to a function of transferring RLC PDUs received from a lower layer to an immediate upper layer in any order, may include a function of, when originally one RLC SDU is segmented into multiple RLC SDUs and then received, reassembling and transferring the same, and may include a function of storing RLC SNs or PDCP SNs of the received RLC PDUs, arranging the sequence thereof, and recording the lost RLC PDUs.

The NR MAC S40 or S55 may be connected to multiple NR RLC layer devices included in one UE, and main functions of the NR MAC may include some of the following functions:
- mapping function (mapping between logical channels and transport channels);
- multiplexing and demultiplexing function (multiplexing/demultiplexing of MAC SDUs);
- scheduling information reporting function (scheduling information reporting);

HARQ function (error correction through HARQ);
function of priority handling between logical channels (priority handling between logical channels of one UE);
function of priority handling between UEs (priority handling between UEs by means of dynamic scheduling);
MBMS service identification function (MBMS service identification);
transmission format selection function (transport format selection); and/or
a padding function (padding).

The NR PHY layers S45 and S50 may perform channel-coding and modulation of upper layer data, make the channel-coded and modulated upper layer data into OFDM symbols, and transmit the OFDM symbols via a radio channel, or may perform demodulation and channel-decoding of the OFDM symbols received through the radio channel and transfer the same to the upper layer.

The detailed structure of the radio protocol structure may be variously changed according to a carrier (or cell) operating method. For example, when the base station transmits data to the UE on the basis of a single carrier (or cell), the base station and the UE use a protocol structure having a single structure for each layer as shown in reference numeral 1410 in FIG. 14. On the other hand, when the base station transmits data to the UE, based on carrier aggregation (CA) using multiple carriers in a single TRP, the base station and the UE use a protocol structure in which a single structure is provided until the RLC layer but the PHY layer is multiplexed via the MAC layer as shown in reference numeral 1420. As another example, when the base station transmits data to the UE, based on dual connectivity (DC) using multiple carriers in multiple TRPs, the base station and the UE use a protocol structure in which a single structure is provided until the RLC layer and the PHY layer is multiplexed via the MAC layer as shown in reference numeral 1430.

Referring to the aforementioned descriptions relating to PDCCH and beam configurations, PDCCH repetitive transmission is not supported currently in Rel-15 and Rel-16 NR, and it is thus difficult to achieve required reliability in a scenario requiring high reliability, such as URLLC. The disclosure provides a method of PDCCH repetitive transmission via multiple transmission points (TRPs) so that PDCCH reception reliability of a UE may be improved. Specific methods are described in detail in the following examples.

Contents of the disclosure are applicable to at least one of FDD and TDD systems. Hereinafter, in the disclosure, upper signaling (or upper layer signaling) is a method of transferring a signal from a base station to a UE by using a physical layer downlink data channel or transferring a signal from a UE to a base station by using a physical layer uplink data channel, and may be referred to as RRC signaling, PDCP signaling, or a medium access control (MAC) control element (MAC CE).

Hereinafter, in the disclosure, in determining whether to apply cooperative communication, it is possible for a UE to use various methods, in which PDCCH(s) assigning PDSCH to which the cooperative communication is applied has a specific format, PDCCH(s) assigning PDSCH to which the cooperative communication is applied includes a specific indicator indicating whether the cooperative communication is applied, PDCCH(s) assigning PDSCH to which the cooperative communication is applied is scrambled with a specific RNTI, or applying of the cooperative communication in a specific section indicated by an upper layer is assumed, and so on. For convenience of description, a case in which a UE receives PDSCH to which cooperative communication has been applied based on conditions similar to the above will be referred to as a non-coherent joint transmission (NC-JT) case.

Hereinafter, in the disclosure, determining the priority between A and B may be mentioned in various ways, such as selecting one having a higher priority according to a predetermined priority rule to perform an operation corresponding thereto, or omitting or dropping an operation having a lower priority.

Hereinafter, in the disclosure, descriptions of the aforementioned examples will be provided via a number of embodiments, but these are not independent ones, and it is possible that one or more embodiments are applied simultaneously or in combination.

[Related to NC-JT]

According to an embodiment of the disclosure, non-coherent joint transmission (NC-JT) may be used for a UE to receive PDSCH from multiple transmission and reception points (TRPs).

Unlike the conventional system, the 5G wireless communication system can support not only a service requiring a high transmission rate, but also a service having a very short transmission delay and a service requiring a high connection density. In a wireless communication network including multiple cells, TRPs, or beams, cooperative communication (coordinated transmission) between respective cells, TRPs, or/and beams may satisfy various service requirements by enhancing the strength of a signal received by a UE or efficiently performing interference control between respective cells, TRPs, or/and beams.

Joint transmission (JT) is a representative transmission technique for the aforementioned cooperative communication, and is a technique for increasing the strength or throughput of a signal received by a UE, by transmitting a signal to one UE via multiple different cells, TRPs, and/or beams. Channels between the UE and respective cells, TRPs, and/or beams may have significantly different characteristics, and in particular, non-coherent joint transmission (NC-JT) supporting non-coherent precoding between respective cells, TRPs, and/or beams may require individual precoding, MCS, resource allocation, TCI indication, etc. according to channel characteristics for respective links between the UE and the respective cells, TRPs, and/or beams.

The aforementioned NC-JT transmission may be applied to at least one of downlink data channel (PDSCH), downlink control channel (PDCCH), uplink data channel (PUSCH), and uplink control channel (PUCCH). During PDSCH transmission, transmission information, such as precoding, modulation coding scheme (MCS), resource allocation, and transmission configuration indication (TCI), is indicated by DL DCI, and for NC-JT transmission, the transmission information may be independently indicated for each cell, TRP, and/or beam. This becomes a major factor in increasing a payload required for DL DCI transmission, which may adversely affect reception performance of PDCCH transmitting DCI. Therefore, it is necessary to carefully design, to support JT of PDSCH, a tradeoff between the amount of DCI information and control information reception performance.

Figure 15:
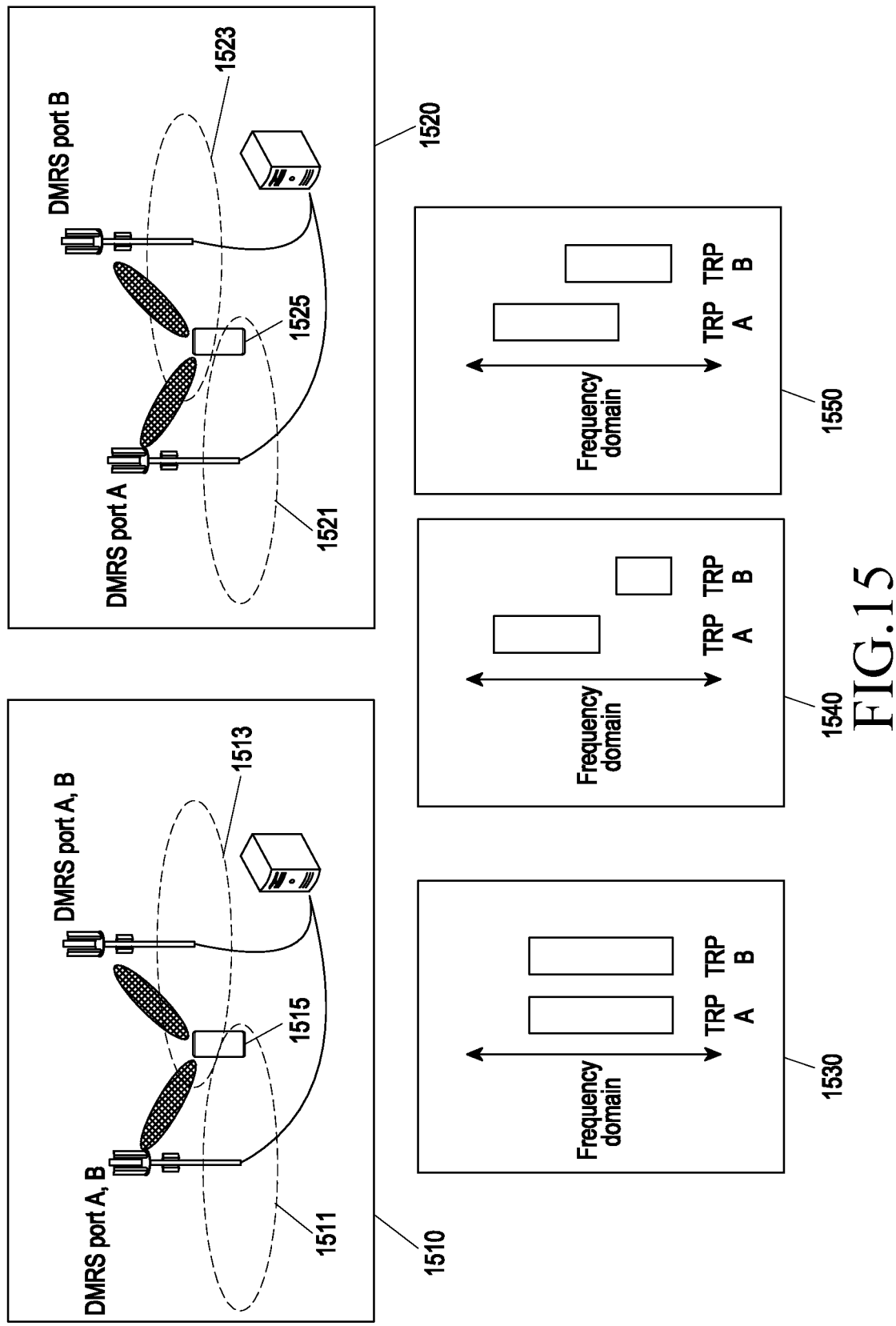
FIG. 15 is a diagram illustrating an example of an antenna port configuration and resource allocation for cooperative communication in the wireless communication system according to an embodiment of the disclosure.

FIG. 15 is a diagram illustrating an example of an antenna port configuration and resource allocation for transmitting PDSCH by using cooperative communication in the wireless communication system according to an embodiment of the disclosure.

Referring to FIG. 15, an example for PDSCH transmission is described for each joint transmission (JT) technique, and examples for allocation of radio resources for each TRP are illustrated.

Referring to FIG. 15, an example 1510 for coherent joint transmission (C-JT) supporting coherent precoding between respective cells, TRPs, and/or beams is illustrated.

In a case of the C-JT, TRP A 1511 and TRP B 1513 transmit a single data (PDSCH) to a UE 1515, and joint precoding may be performed in multiple TRPs. This may indicate that a DMRS is transmitted through identical DMRS ports in order for TRP A 1511 and TRP B 1513 to transmit the same PDSCH. For example, TRP A 1511 and TRP B 1513 may transmit a DRMS to the UE through DMRS port A and DMRS port B, respectively. In this case, the UE may receive one piece of DCI information for reception of one PDSCH demodulated based on the DMRS transmitted through DMRS port A and DMRS port B.

FIG. 15 shows an example 1520 of non-coherent joint transmission (NC-JT) that supports non-coherent precoding between respective cells, TRPs, and/or beams for PDSCH transmission.

In a case of the NC-JT, PDSCH is transmitted to a UE 1525 for each cell, TRP and/or beam, and individual precoding may be applied to each PDSCH. This may indicate that a DMRS is transmitted through different DMRS ports in order for TRP A 1521 and TRP B 1523 to transmit different PDSCHs. For example, TRP A 1521 may transmit a DRMS to the UE through DMRS port A, and TRP B 1523 may transmit a DRMS to the UE through DMRS port B. The UE may receive DCI information for reception of each PDSCH demodulated based on the DMRSs transmitted through DMRS port A and DMRS port B, respectively. Each cell, TRP, and/or beam transmits a different PDSCH layer or different PDSCH to the UE, thereby improving a throughput compared to single cell, TRP, and/or beam transmission. Each cell, TRP, and/or beam repeatedly transmits the same PDSCH to the UE, thereby improving reliability compared to single cell, TRP and/or beam transmission. For convenience of description, a cell, a TRP and/or a beam is hereinafter collectively referred to as a TRP.

In the embodiment of FIG. 15, various radio resource allocation may be considered, such as a case 1530 where frequency and time resources used by multiple TRPs for PDSCH transmission are all identical, a case 1540 where frequency and time resources used by multiple TRPs do not overlap at all, and a case 1550 where some of the frequency and time resources used in multiple TRPs overlap.

In order to assign multiple PDSCHs concurrently to a single UE for NC-JT support, DCI of various types, structures, and relationships may be considered.

Figure 16:
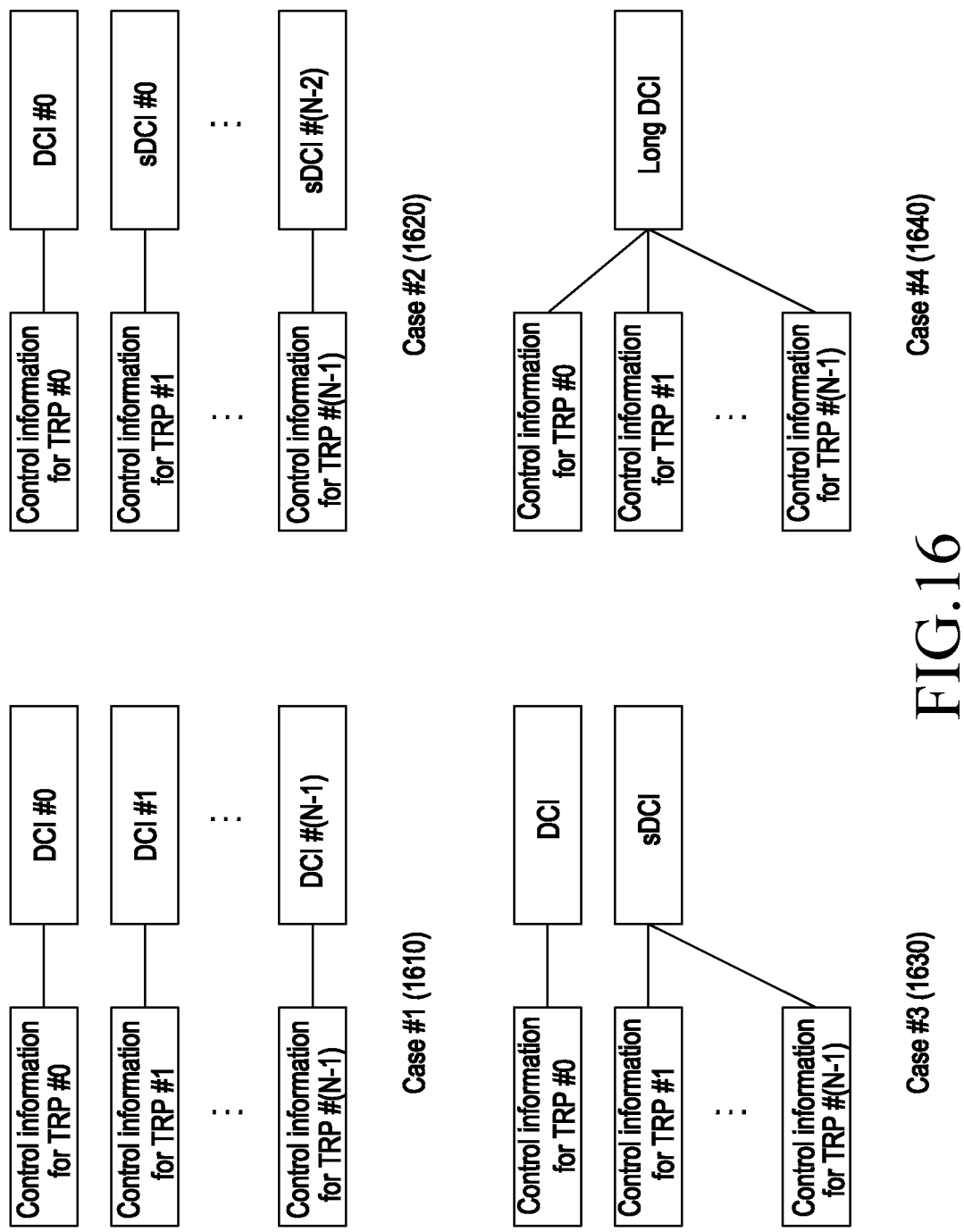
FIG. 16 is a diagram illustrating an example of a downlink control information (DCI) configuration for cooperative communication in the wireless communication system according to an embodiment of the disclosure.

FIG. 16 is a diagram illustrating an example of a configuration of downlink control information (DCI) for NC-JT in which respective TRPs transmit different PDSCHs or different PDSCH layers to a UE in the wireless communication system according to an embodiment of the disclosure.

Referring to FIG. 16, case #1 1610 is an example in which, in a situation where different (N−1) PDSCHs are transmitted from (N−1) additional TRPs (TRP #1 to TRP #(N−1)) in addition to a serving TRP (TRP #0) used during single PDSCH transmission, control information for PDSCHs transmitted in the (N−1) additional TRPs is transmitted independently of control information for PDSCH transmitted in the serving TRP. That is, the UE may acquire control information for PDSCHs transmitted from different TRPs (TRP #0 to TRP #(N−1)) via independent pieces of DCI (DCI #0 to DCI #(N−1)). Formats between the independent pieces of DCI may be the same or different from each other, and payloads between the DCI may also be the same or different from each other. In the aforementioned case #1 1610, each PDSCH control or allocation freedom may be completely guaranteed, but if respective DCI is transmitted in different TRPs, a coverage difference per DCI occurs and reception performance may be thus deteriorated.

Case #2 1620 shows an example dependent on control information (DCI #0) for PDSCH, wherein, in a situation where (N−1) different PDSCHs are transmitted from (N−1) additional TRPs (TRP #1 to TRP #(N−1)) in addition to the serving TRP (TRP #0) used during single PDSCH transmission, control information (DCI) for PDSCHs of the (N−1) additional TRPs is respectively transmitted, and respective pieces of DCI (sDCI #0 to sDCI #(N−2)) are transmitted from the serving TRP.

For example, DCI #0, which is control information for PDSCH transmitted from the serving TRP (TRP #0), includes all information elements of DCI format 1_0, DCI format 1_1, and DCI format 1_2, but shortened DCI (hereinafter, sDCI) (sDCI #0 to sDCI #(N−2)), which is control information for PDSCHs transmitted from cooperative TRPs (TRP #1 to TRP #(N−1)), may include only some of the information elements of DCI format 1_0, DCI format 1_1, and DCI format 1_2. Therefore, in a case of sDCI for transmission of control information for PDSCHs transmitted from cooperative TRPs, a payload is small compared to normal DCI (nDCI) for transmission of control information related to PDSCH transmitted from the serving TRP, and it is thus possible to include reserved bits when compared to nDCI.

In the aforementioned case #2 1620, each PDSCH control or allocation freedom may be restricted according to content of an information element included in sDCI, but since reception performance of sDCI is superior to that of nDCI, a probability that a coverage difference occurs for each DCI may be lowered.

In FIG. 16, case #3 1630 shows an example dependent on control information (DCI) for PDSCH, wherein, in a situation where (N−1) different PDSCHs are transmitted from (N−1) additional TRPs (TRP #1 to TRP #(N−1)) in addition to the serving TRP (TRP #0) used during single PDSCH transmission, one piece of control information (sDCI) for PDSCHs of the (N−1) additional TRPs is transmitted, and this DCI is transmitted from the serving TRP.

For example, DCI #0, which is control information for PDSCH transmitted from the serving TRP (TRP #0), includes all information elements of DCI format 1_0, DCI format 1_1, and DCI format 1_2, and in a case of control information for PDSCHs transmitted from cooperative TRPs (TRP #1 to TRP #(N−1)), only some of the information elements of DCI format 1_0, DCI format 1_1, and DCI format 1_2 can be collected in one "secondary" DCI (sDCI) so as to be transmitted. For example, the sDCI may include at least one piece of HARQ-related information, such as frequency domain resource assignment, time domain resource assignment, and MCS of cooperative TRPs. In addition, information that is not included in sDCI, such as a bandwidth part (BWP) indicator or a carrier indicator, may be based on DCI (DCI #0, normal DCI, or nDCI) of the serving TRP.

In case #3 1630 in FIG. 16, each PDSCH control or allocation freedom may be restricted according to content of the information element included in sDCI, but sDCI reception performance may be adjustable, and complexity of DCI blind decoding of the UE may be reduced compared to case #1 1610 or case #2 1620.

In FIG. 16, case #4 1640 is an example in which, in a situation where (N−1) different PDSCHs are transmitted from (N−1) additional TRPs (TRP #1 to TRP #(N−1)) in addition to the serving TRP (TRP #0) used during single PDSCH transmission, control information for PDSCHs transmitted from the (N−1) additional TRPs is transmitted in the same DCI (long DCI) as that for transmission of control information for PDSCH transmitted from the serving TRP. That is, the UE may acquire control information for PDSCHs transmitted from different TRPs (TRP #0 to TRP #(N−1)) via single DCI. In case #4 1640, complexity of DCI blind decoding of the UE may not increase, but PDSCH control or allocation freedom may be low, such that the number of cooperative TRPs is limited according to long DCI payload restrictions.

In the following descriptions and embodiments, sDCI may refer to various auxiliary DCI, such as shortened DCI, secondary DCI, and normal DCI (aforementioned DCI formats 1_0 to 1_1) including PDSCH control information transmitted in the coordinated TRP, and if no particular restriction is specified, the description is similarly applicable to the various auxiliary DCI.

In the following description and embodiments, aforementioned cases #1 1610, case #2 1620, and case #3 1630, in which one or more DCI (PDCCHs) is used for NC-JT support are classified as multiple PDCCH-based NC-JT, and aforementioned case #4 1640 in which single DCI (PDCCH) is used for NC-JT support may be classified as single PDCCH-based NC-JT. In multiple PDCCH-based PDSCH transmission, a CORESET in which DCI of the serving TRP (TRP #0) is scheduled and a CORESET in which DCI of the cooperative TRPs (TRP #1 to TRP #(N−1)) are scheduled may be distinguished. As a method for distinguishing CORESETs, there may be a distinguishing method via an upper layer indicator for each CORESET, a distinguishing method via a beam configuration for each CORESET, and the like. In the single PDCCH-based NC-JT, single DCI schedules single PDSCH having multiple layers instead of scheduling multiple PDSCHs, and the aforementioned multiple layers may be transmitted from multiple TRPs. In this case, a connection relationship between a layer and a TRP for transmitting the layer may be indicated via a transmission configuration indicator (TCI) indication for the layer.

In embodiments of the disclosure, "cooperative TRP" may be replaced with various terms, such as "cooperative panel" or "cooperative beam" when actually applied.

In embodiments of the disclosure, "when NC-JT is applied" may be interpreted in various ways according to a situation such as "when a UE receives one or more PDSCHs at the same time in one BWP," "when a UE receives PDSCH based on two or more transmission configuration indicator (TCI) indications at the same time in one BWP," "when PDSCH received by a UE is associated with one or more DMRS port groups," etc., but it is used as an expression for convenience of description.

In the disclosure, the radio protocol structure for NC-JT may be used in various ways according to a TRP deployment scenario. For example, if there is no or small backhaul delay between cooperative TRPs, a method (CA-like method) using a structure based on MAC layer multiplexing similar to reference numeral 1420 of FIG. 14 is possible. On the other hand, if a backhaul delay between cooperative TRPs is so large that the backhaul delay cannot be ignored (e.g., when 2 ms or more is required for information exchange such as CSI, scheduling, HARQ-ACK, etc. between cooperative TRPs), similar to reference numeral 1430 of FIG. 14, a method (DC-like method) for securing characteristics robust to delay by using an independent structure for each TRP from the RLC layer is possible.

A UE supporting the C-JT/NC-JT may receive a C-JT/NC-JT-related parameter, setting value, or the like from an upper layer configuration, and may set an RRC parameter of the UE on the basis thereof. For the upper layer configuration, the UE may utilize, for example, tci-StatePDSCH as a UE capability parameter. The tci-StatePDSCH may define TCI states for the purpose of PDSCH transmission, the number of TCI states may be configured to 4, 8, 16, 32, 64, and 128 in FR1 and configured to 64, 128 in FR2, and among the configured numbers, up to 8 states which may be indicated by 3 bits of a TCI field of DCI via a MAC CE message may be configured. The maximum value of 128 refers to a value indicated by maxNumberConfiguredTCI-statesPerCC in the tci-StatePDSCH parameter included in capability signaling of the UE. In this way, a series of configuration procedures from an upper layer configuration to a MAC CE configuration may be applied to a beamforming change command or a beamforming indication for at least one PDSCH in one TRP.

[Multi-DCI Based Multi-TRP]

According to an embodiment of the disclosure, a downlink control channel for NC-JT transmission may be configured based on multi-PDCCH.

In multiple PDCCH-based NC-JT, when DCI for a PDSCH schedule of each TRP is transmitted, there may be a CORESET or search space that is classified for each TRP. The CORESET or search space for each TRP can be configured as at least one of the following examples.

In one example of, upper layer index configuration for each CORESET, CORESET configuration information configured via an upper layer may include an index value, and a TRP for transmission of PDCCH from the corresponding CORESET may be distinguished by a configured index value for each CORESET. That is, in a set of CORESETs having the same upper layer index value, it may be considered that the same TRP transmits PDCCH or that PDCCH scheduling PDSCH of the same TRP is transmitted. The aforementioned index for each CORESET may be named as CORESETPoolIndex, and for CORESETs for which the same CORESETPoolIndex value is configured, it may be considered that PDCCH is transmitted from the same TRP. In a case of a CORESET for which a CORESETPoolIndex value is not configured, it may be considered that a default value of CORESETPoolIndex is configured, wherein the default value may be 0.

In one example of multiple PDCCH-Config configuration, multiple PDCCH-Configs in one BWP may be configured, and each PDCCH-Config may include a PDCCH configuration for each TRP. That is, a list of CORESETs for each TRP and/or a list of search spaces for each TRP may be configured in one PDCCH-Config, and one or more CORESETs and one or more search spaces included in one PDCCH-Config may be considered to correspond to a specific TRP.

In one example of CORESET beam/beam group configuration, a TRP corresponding to a corresponding CORESET may be distinguished via a beam or beam group configured for each CORESET. For example, when the same TCI state is configured for multiple CORESETs, corresponding CORESETs may be considered to be transmitted via the same TRP, or it may be considered that PDCCH which schedules PDSCH of the same TRP is transmitted in the corresponding CORESET.

In one example of search space beam/beam group configuration, a beam or beam group may be configured for each search space, and a TRP for each search space may be distinguished based thereon. For example, when the same beam/beam group or TCI state is configured in multiple search spaces, it may be considered, in the search space, that the same TRP transmits PDCCH, or that PDCCH which schedules PDSCH of the same TRP is transmitted in the search space.

By distinguishing the CORESET or search space for each TRP as described above, it is possible to classify PDSCH and HARQ-ACK information for each TRP, and based on this, independent PUCCH resource use and independent HARQ-ACK codebook generation for each TRP are possible.

The aforementioned configuration may be independent for each cell or for each BWP. For example, while two different CORESETPoolIndex values are configured for a PCell, a CORESETPoolIndex value may not be configured for a specific SCell. In this case, it may be considered that NC-JT transmission is configured for the PCell, whereas NC-JT transmission is not configured for the SCell in which the CORESETPoolIndex value has not been configured.

[Single-DCI-Based Multi-TRP]

According to another embodiment of the disclosure, a downlink beam for NC-JT transmission may be configured based on single-PDCCH.

In single PDCCH-based NC-JT, PDSCHs transmitted by multiple TRPs may be scheduled via one DCI. The number of TCI states may be used for a method of indicating the number of TRPs which transmit corresponding PDSCH. That is, if the number of TCI states indicated in DCI for scheduling of PDSCH is two, consideration may be made as single PDCCH-based NC-JT transmission, and if the number of TCI states is one, consideration may be made as single-TRP transmission. The TCI states indicated by the DCI may correspond to one or two TCI states among TCI states activated by MAC-CE. If the TCI states of DCI correspond to two TCI states activated by MAC-CE, the correspondence between a TCI codepoint indicated in DCI and the TCI states activated by MAC-CE is established, and there may be two TCI states activated by MAC-CE, which correspond to the TCI codepoint.

The aforementioned configuration may be independent for each cell or for each BWP. For example, a PCell may have up to two activated TCI states corresponding to one TCI codepoint, whereas a specific SCell may have up to one activated TCI state corresponding to one TCI codepoint. In this case, it may be considered that NC-JT transmission is configured for the PCell, whereas NC-JT transmission is not configured for the aforementioned SCell.

Referring to the aforementioned descriptions relating to PDCCH and beam configurations, PDCCH repetitive transmission is not supported currently in Rel-15 and Rel-16 NR, and it is thus difficult to achieve required reliability in a scenario requiring high reliability, such as URLLC. The disclosure provides a method of PDCCH repetitive transmission via multiple transmission points (TRPs) so that PDCCH reception reliability of a UE may be improved. Specific methods are described in detail in the following examples.

In the following description, for the convenience of description, a cell, a transmission point, a panel, a beam, or/and a transmission direction, etc. which may be distinguished via upper layer/L1 parameters such as TCI state or spatial relation information, or indicators such as a cell ID, a TRP ID, and a panel ID are described in a unified manner as a transmission reception point (TRP). Therefore, in actual application, TRP can be appropriately replaced by one of the above terms.

Hereinafter, in the disclosure, in determining whether to apply cooperative communication, it is possible for a UE to use various methods, in which PDCCH(s) assigning PDSCH to which the cooperative communication is applied has a specific format, PDCCH(s) assigning PDSCH to which the cooperative communication is applied includes a specific indicator indicating whether the cooperative communication is applied, PDCCH(s) assigning PDSCH to which the cooperative communication is applied is scrambled with a specific RNTI, or applying of the cooperative communication in a specific section indicated by an upper layer is assumed, and so on. Hereinafter, for convenience of description, a case in which a UE receives PDSCH to which cooperative communication has been applied based on conditions similar to the above will be referred to as an NC-JT case.

Hereinafter, in describing the disclosure, upper layer signaling may be signaling corresponding to at least one of signalings below or a combination of one or more thereof:
  Master information block (MIB);
  System information block (SIB) or SIB X (X=1, 2, . . . );
  Radio resource control (RRC); and/or
  Medium access control (MAC) control element (CE).

L1 signaling may be signaling corresponding to at least one of signaling methods, described below, using a physical layer channel or a combination of one or more of the methods:
  Physical downlink control channel (PDCCH);
  Downlink control information (DCI);
  UE-specific DCI;
  Group common DCI;
  Common DCI;
  Scheduling DCI (e.g., DCI used for scheduling downlink or uplink data);
  Non-scheduling DCI (e.g., DCI not for scheduling downlink or uplink data);
  Physical uplink control channel (PUCCH); and/or
  Uplink control information (UCI).

Hereinafter, in the disclosure, determining the priority between A and B may be mentioned in various ways, such as selecting one having a higher priority according to a predetermined priority rule to perform an operation corresponding thereto, or omitting or dropping an operation having a lower priority.

Hereinafter, in the disclosure, descriptions of the aforementioned examples will be provided via a number of embodiments, but these are not independent ones, and it is possible that one or more embodiments are applied simultaneously or in combination. That is, the following first to third embodiments may be implemented individually, or may be implemented by combining two or more thereof.

First Embodiment: Multiple TRP-Based PDCCH Repetitive Transmission Method

As an embodiment of the disclosure, restrictions on the maximum numbers of PDCCH candidate groups and CCEs according to a method of PDCCH repetitive transmission in consideration of multiple TRP will be described. For PDCCH repetitive transmission in consideration of multiple TRPs, various methods may exist depending on how to apply each TCI state, which is to be applied when PDCCH is transmitted in each TRP, to the aforementioned various parameters used for PDCCH transmission. For example, various parameters used for PDCCH transmission to which different TCI states are applied may include CCE, PDCCH candidate group, control resource set, search space, and the like. During PDCCH repetitive transmission in consideration of multiple TRPs, a soft combining scheme for combining multiple PDCCH signals received via repetitive transmission, a selection scheme, and the like may be considered for a reception scheme of the UE.

The following four methods may exist for PDCCH repetitive transmission via multiple TRPs, and with respect to at least one of four methods, a base station may perform, for a UE, configuration via upper layer signaling, indication via L1 signaling, or configuration and indication via a combination of upper layer signaling and L1 signaling.

In one embodiment of [Method 1], method for repetitively transmitting multiple PDCCHs having the same payload is provided.

Method 1 is a method of repetitively transmitting multiple pieces of control information having the same DCI format and payload. Respective pieces of the aforementioned control information may include information for scheduling of repetitively transmitted PDSCHs, for example, {PDSCH #1, PDSCH #2, PDSCH #Y} which are repetitively transmitted over multiple slots. The fact that the payloads of the respective pieces of repetitively transmitted control information are the same may represent that PDSCH scheduling information of all the respective pieces of control information is the same, wherein the PDSCH scheduling information includes, for example, the number of PDSCH repetitive transmissions, time domain PDSCH resource allocation information (i.e., TDRA), that is, a slot offset (K_0) between the control information and PDSCH #1, the number of PDSCH symbols, etc., frequency domain PDSCH resource allocation information (i.e., FDRA), DMRS port assignment information, PDSCH-to-HARQ-ACK timing, a PUCCH resource indicator, and the like. A UE may improve reception reliability of the control information by soft-combining the repetitively transmitted control information having the same payload.

For the soft combining, the UE needs to know in advance a resource location of control information to be repetitively transmitted, the number of repetitive transmissions, and the like. To this end, a base station may indicate, to the UE in advance, at least one of time domain, frequency domain, and spatial domain resource configurations of the aforementioned repetitive transmission control information. In a case where the control information is repetitively transmitted in the time domain, the control information may be repetitively transmitted over different CORESETs, repetitively transmitted over different search space sets within one CORESET, or repetitively transmitted over different PDCCH monitoring occasions within one CORESET and one search space set. A unit (CORESET unit, search space set unit, or PDCCH) of a resource repetitively transmitted in the time domain and a location (PDCCH candidate index, etc.) of the repetitive transmission resource may be indicated from the base station via upper layer configuration, etc. The number of PDCCH repetitive transmissions and/or a list and a transmission pattern of TRPs participating in the repetitive transmission may be explicitly indicated, and an upper layer indication, MAC-CE/L1 signaling, or the like may be used as an explicit indication method. The list of TRPs may be indicated in the form of a TCI state or aforementioned QCL assumption.

In a case where the control information is repetitively transmitted in the frequency domain, the control information may be repetitively transmitted over different CORESETs, repetitively transmitted over different PDCCH candidates within one CORESET, or repetitively transmitted for each CCE. A unit of a resource in which the control information is repetitively transmitted in the frequency domain and a location of the resource for repetitive transmission may be indicated from the base station via upper layer configuration, etc. The number of repetitive transmissions and/or a list and a transmission pattern of TRPs participating in the repetitive transmission may be explicitly indicated, and an upper layer indication, MAC-CE/L1 signaling, or the like may be used as an explicit indication method. The list of TRPs may be indicated in the form of a TCI state or aforementioned QCL assumption.

In a case where the control information is repetitively transmitted in the spatial domain, the control information may be repetitively transmitted over different CORESETs, or the control information may be repetitively transmitted by configuration of two or more TCI states in one CORESET.

In one embodiment of [Method 2], method of repetitively transmitting multiple pieces of control information that may have different DCI formats and/or payloads is provided.

Method 2 is a method of repetitively transmitting multiple pieces of control information that may have different DCI formats and/or payloads. The multiple pieces of control information are for scheduling of repetitively transmitted PDSCH, and the number of repetitive PDSCH transmissions indicated by the respective pieces of control information may be different from each other. For example, PDCCH #1 may indicate/include information for scheduling of {PDSCH #1, PDSCH #2, PDSCH #Y}, whereas PDCCH #2 may indicate/include information for scheduling of {PDSCH #2, PDSCH #Y}, and PDCCH #X may indicate/include information for scheduling of {PDSCH Y}. This method of repetitively transmitting control information has the advantage of reducing a total delay time required for repetitive transmission of control information and PDSCH compared to Method 1 above. On the other hand, in method 2, since payloads of respective pieces of repetitively transmitted control information may be different from each other, soft combining of repetitively transmitted control information is impossible, and thus reliability may be lower compared to Method 1 above.

In method 2, a UE may not need to know, in advance, the number of repetitive transmissions, a resource location, etc. of the control information to be repetitively transmitted, and the UE may independently decode and process respective pieces of the repetitively transmitted control information. If the UE decodes multiple pieces of repetitively transmitted control information for scheduling of the same PDSCH, only first repetitively transmitted control information may be processed and second and subsequent repetitively transmitted control information may be ignored. Alternatively, the number of repetitive transmissions, resource location, etc. of the control information to be repetitively transmitted may be indicated in advance, and an indication method may be the same as the method described in method 1.

In one embodiment of [Method 3], method of separately and repetitively transmitting multiple pieces of control information that may have different DCI formats and/or payloads are provided.

Method 3 is a method of separately and repetitively transmitting multiple pieces of control information that may have different DCI formats and/or payloads. In this case, respective pieces of repetitively transmitted control information may have the same DCI format and payload. The multiple pieces of control information in method 2 are unable to be soft-combined, and may thus have low reliability compared to method 1, and a total delay time required for repetitive transmission of control information and PDSCH in method 1 may be increased. Method 3 is a method using advantages of method 1 and method 2, wherein control information may be transmitted with high reliability compared to method 2, while reducing the total delay time required for repetitive transmission of control information and PDSCH compared to method 1.

In method 3, in order to decode and soft-combine the repetitively transmitted control information, the soft combining of method 1 and the individual decoding of method 2 may be used. As an example, during repetitive transmissions of multiple pieces of control information that may have different DCI formats and/or payloads, respectively, first transmitted control information may be decoded as in method 2, and repetitive transmission of the decoded control information may be soft-combined as in method 1.

A base station may select and configure one of method 1, method 2, or method 3 for repetitive transmission of control information. A method of repetitively transmitting control information may be explicitly indicated by the base station to the UE via upper layer signaling. Alternatively, the method of repetitively transmitting control information may be indicated in combination with other configuration information. For example, an upper layer configuration indicating a PDSCH repetitive transmission method may be combined with an indication for repetitive transmission of the control information. In a case where PDSCH is indicated to be repetitively transmitted according to an FDM scheme, the case may be interpreted that the control information is repetitively transmitted only by method 1, and this is because method 2 does not reduce a delay time for PDSCH repetitive transmission in the FDM scheme. For a similar reason, when the PDSCH is indicated to be repetitively transmitted in an intra-slot TDM scheme, this may be interpreted that the control information is repetitively transmitted according to method 1. On the other hand, when PDSCH is indicated to be repetitively transmitted in an inter-slot TDM scheme, method 1, method 2, or method 3 for repetitive transmission of control information may be selected via upper layer signaling or L1 signaling.

A base station may explicitly indicate, to a UE, a repetitive transmission unit of control information via configuration of an upper layer, etc. Alternatively, the repetitive transmission unit of the control information may be indicated in combination with other configuration information. For example, an upper layer configuration indicating a PDSCH repetitive transmission method may be combined with the repetitive transmission unit of the control information. In a case where PDSCH is indicated to be repetitively transmitted in the FDM scheme, the case may be interpreted that the control information is repetitively transmitted in the FDM scheme or an SDM scheme, and this is because, if the control information is repetitively transmitted in a scheme, such as the inter-slot TDM scheme, there is no effect of reducing a delay time due to PDSCH repetitive transmission in the FDM scheme. For a similar reason, when PDSCH is indicated to be repetitively transmitted in the intra-slot TDM scheme, this may be interpreted that the control information is repetitively transmitted in the intra-slot TDM, FDM or SDM scheme. On the other hand, in a case where PDSCH is indicated to be repetitively transmitted in the inter-slot TDM scheme, a method of repetitively transmitting the control information may be selected via upper layer signaling or the like so that the control information may be repetitively transmitted in the inter-slot TDM, intra-slot TDM, FDM, or SDM scheme.

In one embodiment of [Method 4], PDCCH transmission scheme of applying multiple TCI states is provided.

In method 4, in order to improve reception performance of PDCCH without PDCCH repetitive transmission, PDCCH may be transmitted by applying, to different CCEs within a PDCCH candidate group, different TCI states indicating transmission from multiple TRPs. Method 4 does not correspond to PDCCH repetitive transmission, but since PDCCH is transmitted in respective TRPs by applying different TCI states to different CCEs within the PDCCH candidate group, method 4 may be a scheme of acquiring spatial diversity within the PDCCH candidate group. The different CCEs to which the different TCI states are applied may be separated in a time or frequency dimension, and a UE needs to know, in advance, locations of resources to which the different TCI states are applied. The UE may receive the different CCEs, to which the different TCI states have been applied, in different PDCCHs and may decode the CCEs independently or at once.

Second Embodiment: Limiting the Maximum Numbers of PDCCH Candidate Groups and CCEs According to PDCCH Repetitive Transmission Method A UE may individually report UE capability to a base station with respect to a supportable method among methods 1 to 4 for the PDCCH repetitive transmission of the base station. The UE may report, to the base station, UE capability including whether soft combining is supported for a reception scheme of the UE with respect to PDCCH repetitive transmission. The UE may report, to the base station, UE capability for restriction on the maximum numbers of PDCCH candidate groups and CCEs according to PDCCH repetitive transmission. The reported UE capability may include at least one of restriction per individual slot, restriction per multiple slots, restriction per individual span, and restriction per multiple spans. The UE may report, to the base station, UE capability including a scheme of counting the numbers of PDCCH candidate groups and CCEs with respect to a supportable method among PDCCH repetitive transmission schemes of the aforementioned four methods.

According to the UE capability report and transmission conditions of the base station, the scheme of counting the numbers of PDCCH candidate groups and CCEs may be different.

Figure 17:
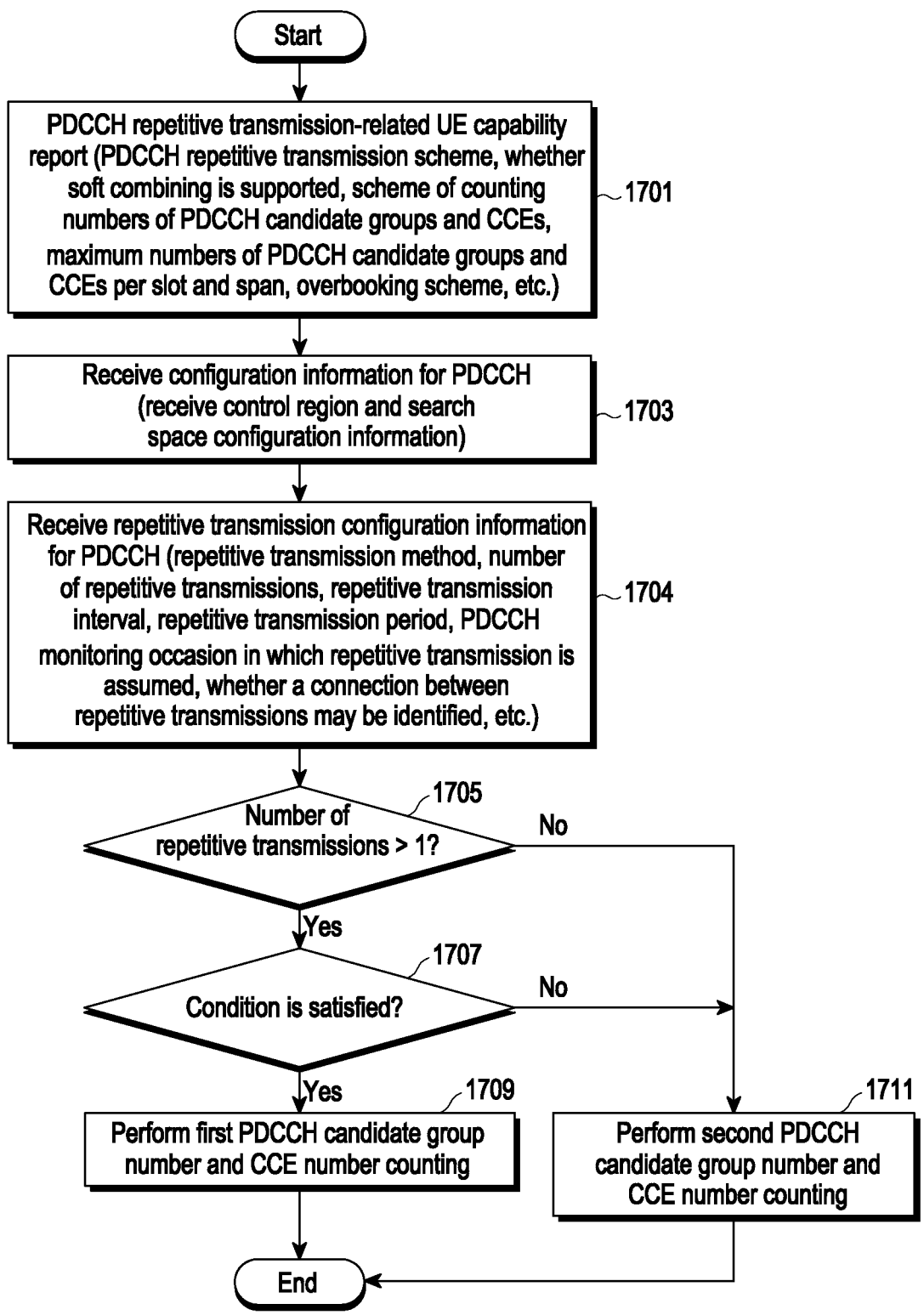
FIG. 17 is a diagram illustrating an operation of a UE, for counting the numbers of PDCCH candidate groups and CCEs according to whether a transmission condition of a base station is satisfied and a UE capability report during PDCCH repetitive transmission.

FIG. 17 is a diagram illustrating an operation of a UE, for counting the numbers of PDCCH candidate groups and/or CCEs according to whether a transmission condition of a base station is satisfied and a UE capability report for PDCCH repetitive transmission according to an embodiment of the disclosure.

Referring to FIG. 17, a UE reports 1701, to a base station, UE capability related to PDCCH repetitive transmission. Information on the UE capability may include information on at least one among a PDCCH repetitive transmission scheme (for example, it may be one of [Method 1] to [Method 4]) supported by the UE, whether soft combining according to PDCCH repetitive transmission is supported, a scheme of counting the numbers of PDCCH candidate groups and CCEs, the maximum numbers of PDCCH candidate groups and CCEs per individual slot/multiple slots and per individual span/multiple spans, and the aforementioned overbooking scheme. As another embodiment, if information on the UE capability is preconfigured for the corresponding UE, the operation in 1701 may be omitted. In addition, with respect to UEs of a predetermined group, if information on the UE capability is equally applied as default information, operation 1701 may be omitted.

Then, the UE may receive 1703 first configuration information for PDCCH from the base station, and may additionally receive 1704 second configuration information for PDCCH repetitive transmission. The first configuration information may include configuration information on at least one of a control region and a search space. The second configuration information may include information on at least one of a repetitive transmission method, the number of repetitive transmissions, a repetitive transmission interval, a repetitive transmission period, a PDCCH monitoring occasion in which repetitive transmission is assumed, and whether a connection between repetitive transmissions may be identified. The UE may be able to receive at least a part of the first and second configuration information via L1 signaling, or to implicitly determine at least part of the first and second configuration information on the basis of other configuration information. The first and second configuration information may be included in one piece of configuration information so as to be provided. Accordingly, classification of the first and second configuration information shows an embodiment, and the method of providing configuration information may be modified and implemented in various forms.

The UE having received the configuration information determines 1705 the number of the repetitive transmissions (e.g., N, an integer with N≥1), and if the number of the repetitive transmissions is greater than 1, the UE determines 1707 whether a transmission condition of the base station is satisfied. The transmission condition may be a combination of at least one of [condition 1] to [condition 4] to be described later. If the transmission condition is not satisfied, the UE operates 1711 using an existing PDCCH candidate group number and CCE number counting scheme (second PDCCH candidate group number and/or CCE number counting scheme), and if the transmission condition is satisfied, the UE operates 1709 by applying new criteria (first PDCCH candidate group number and/or CCE number counting scheme) to the PDCCH candidate group number and CCE number counting. When the numbers of PDCCH candidate groups and CCEs are counted by applying the new criteria, if the number of PDCCH repetitive transmissions is N, the UE may apply one of the following [operation 1] to [operation 3]. If the number of the repetitive transmissions is not greater than 1 (i.e., if the number of repetitive transmissions is 1,) in operation 1705, the UE proceeds to operation 1711 and operates using the existing PDCCH candidate group number and CCE number counting scheme (second PDCCH candidate group number and/or CCE number counting scheme). The number of the repetitive transmission being 1 indicates that repetitive transmission is not performed.

[Operation 1] Counting N Repetitive Transmissions as 1.

Even if the UE receives N repetitive PDCCH transmissions according to the UE capability, the numbers of PDCCH candidate groups and CCEs may be counted by considering all N repetitive transmissions as 1. For example, when repetitive transmission is performed twice, the numbers of PDCCH candidate groups and/or CCEs may be counted by considering two repetitively transmitted PDCCHs as one.

[Operation 2] Existing counting scheme.

With respect to PDCCH candidates repetitively transmitted N times, the UE may perform counting, N times compared to before, the numbers of the PDCCH candidate groups and/or CCEs according to the existing counting scheme, under the assumption, for example, that individual decoding is performed without performing soft combining. For example, when repetitive transmission is performed twice, two different PDCCH transmissions may be counted as 2, as in the case of counting the numbers of the PDCCH candidate groups and/or CCEs.

[Operation 3] Counting as $2^N-1$.

Under the assumption of counting 1 every time soft combining is performed on at least one combination of PDCCH candidates repetitively transmitted N times, the UE may perform counting as $2^N-1$ when repetitive transmission is performed N times. For example, when two times of PDCCH repetitive transmission are received from the base station, the UE may individually count a first PDCCH transmission and a second PDCCH transmission, and may additionally count 1 more by assuming soft combining of the first PDCCH transmission and the second PDCCH transmission, thereby counting the numbers of the PDCCH candidate groups and/or CCEs so that a total number is 3 ($2^N-1=3$ times).

Items that may be considered as the transmission condition of the base station, which enables counting the numbers of the PDCCH candidate groups and/or CCEs by applying new criteria as described above, are possible by a combination of at least one of the following [condition 1] to [condition 4].

[Condition 1] Whether soft combining is supported.

The UE may differently count the numbers of PDCCH candidate groups and/or CCEs according to whether soft combining is supported, which is transferred to the base station via a UE capability report. For example, if the UE is able to support soft combining according to PDCCH repetitive transmission, the UE may count the numbers of PDCCH candidate groups and/or CCEs by selecting one of aforementioned operations 1 to 3. When the UE receives, from the base station, a PDCCH repetitive transmission configuration or indication which enables soft combining (e.g., the same DMRS location according to the same scrambling sequence, the same PDCCH candidate group location according to the same hash function result, etc.), the UE may select one of operations 1 to 3 to count the numbers of PDCCH candidate groups and/or CCEs.

[Condition 2] Whether repetitively transmitted PDCCH exists in the same control resource set or in different control resource sets.

Depending on whether PDCCH repetitively transmitted from the base station exists in the same control resource set or in different control resource sets, the UE may differently count the numbers of PDCCH candidate groups and/or CCEs.

[Condition 3] PDCCH repetitive transmission scheme.

The UE may differently count the numbers of PDCCH candidate groups and/or CCEs according to the aforementioned four PDCCH repetitive transmission schemes (methods 1 to 4). In a case where the PDCCH repetitive transmission schemes of methods 1 and 3 capable of soft combining are configured and indicated to the UE by the base station, and in a case of counting the numbers of PDCCH candidate groups and/or CCEs with respect to the repetitive transmission scheme of method 4, that is, a PDCCH transmission scheme in consideration of non-repetition-based multiple TRPs, the UE may apply the new criteria (first PDCCH candidate group number and CCE number counting scheme) to counting of the numbers of PDCCH candidate groups and/or CCEs.

[Condition 4] The number of applied TCI states, or whether the same TCI state or different TCI states are applied.

Depending on the number of TCI states applied to PDCCH transmitted from the base station, or whether the same TCI state or different TCI states are applied, the UE may differently count the numbers of PDCCH candidate groups and/or CCEs.

Third Embodiment: Overbooking Method According to PDCCH Repetitive Transmission Method According to the UE capability report and the transmission conditions of the base station, the scheme of counting the numbers of PDCCH candidate groups and/or CCEs may be different.

Figure 18:
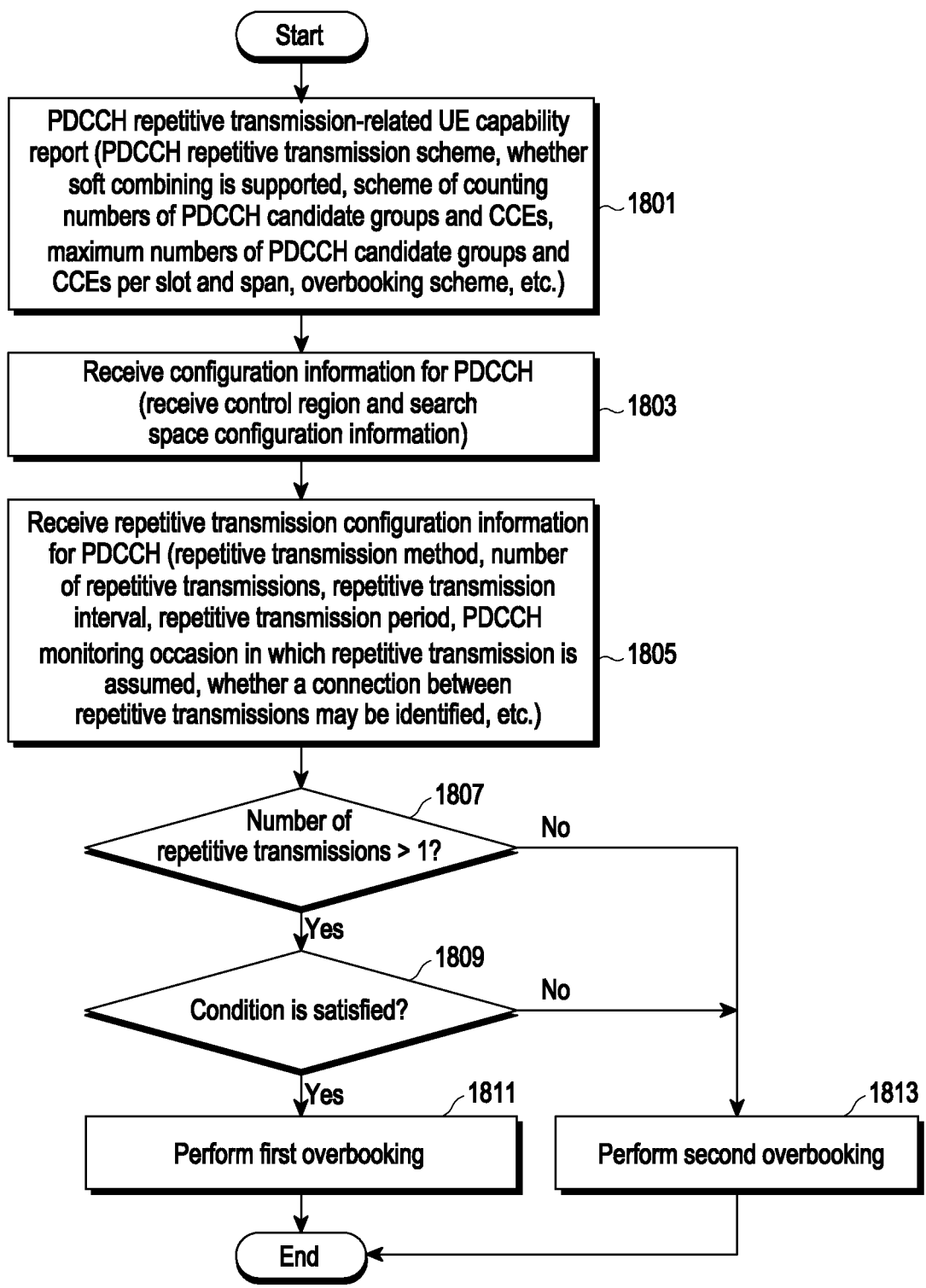
FIG. 18 is a diagram illustrating an operation of a UE, for counting the numbers of PDCCH candidate groups and CCEs according to whether a transmission condition of a base station is satisfied and a UE capability report during PDCCH repetitive transmission, according to various embodiments of the disclosure.

FIG. 18 is a diagram illustrating an operation of a UE counting the numbers of PDCCH candidate groups and/or CCEs according to whether a transmission condition of a base station is satisfied and a UE capability report for PDCCH repetitive transmission, according to various embodiments of the disclosure.

Referring to FIG. 18, a UE reports 1801, to a base station, UE capability related to PDCCH repetitive transmission. Information on the UE capability report may include information on at least one among a PDCCH repetitive transmission scheme (for example, it may be one of [Method 1] to [Method 4]) supported by the UE, whether soft combining according to PDCCH repetitive transmission is supported, a scheme of counting the numbers of PDCCH candidate groups and CCEs, the maximum numbers of PDCCH candidate groups and CCEs per individual slot/multiple slots and per individual span/multiple spans, and the aforementioned overbooking scheme. As another embodiment, if information on the UE capability is preconfigured for the corresponding UE, the operation in 1801 may be omitted. In addition, with respect to UEs of a predetermined group, if information on the UE capability is equally applied as default information, operation 1801 may be omitted.

Then, the UE may receive 1803 first configuration information for PDCCH from the base station, and may additionally receive 1805 second configuration information for PDCCH repetitive transmission. The first configuration information may include configuration information on at least one of a control region and a search space. The second configuration information may include information on at least one of a repetitive transmission method, the number of repetitive transmissions, a repetitive transmission interval, a repetitive transmission period, a PDCCH monitoring occasion in which repetitive transmission is assumed, and whether a connection between repetitive transmissions may be identified. The UE may be able to receive at least a part of the first and second configuration information via L1 signaling, or to implicitly determine at least part of the first and second configuration information on the basis of other configuration information. The first and second configuration information may be included in one piece of configuration information so as to be provided. Accordingly, classification of the first and second configuration information shows an embodiment, and the method of providing configuration information may be modified and implemented in various forms.

The UE having received the configuration information determines 1807 the number of the repetitive transmissions (e.g., N, an integer with N≥1), and if the number of the repetitive transmissions is greater than 1, the UE determines 1809 whether a transmission condition of the base station is satisfied. The transmission condition may be a combination of at least one of aforementioned [condition 1] to [condition 4]. If the transmission condition is not satisfied, the UE operates 1813 using the existing overbooking scheme (second overbooking scheme), and if the transmission condition is satisfied, the UE operates 1811 by applying new criteria (first overbooking scheme) to the overbooking scheme. When the overbooking scheme is performed by applying the new criteria, if the number of PDCCH repetitive transmissions is N, one of the following [operation 4] and [operation 5] may be applied. If the number of repetitive transmissions is not greater than 1 in operation 1807 (that is, if the number of repetitive transmissions is 1), the UE proceeds to operation 1813 and operates using the existing overbooking scheme (second overbooking scheme). The number of the repetitive transmission being 1 indicates that repetitive transmission is not performed.

[Operation 4] Reusing existing overbooking scheme.

If the numbers of PDCCH candidate groups and/or CCEs exceed restriction on the maximum numbers of PDCCH candidate groups and/or CCEs at a corresponding time point, the UE may monitor only some of configured search space sets, and the base station may transmit PDCCH in the selected search space sets so that the restriction on the maximum numbers of PDCCH candidate groups and CCEs is satisfied. Even if PDCCH repetitive transmission occurs within a specific search space set or occurs over multiple search space sets, the UE may perform overbooking in the existing manner. That is, among search space sets existing at the corresponding time point, a search space set, the search space type of which is configured as a common search space, may be preferentially selected over a search space set configured as a UE-specific search space. If all the search space sets configured to be the common search space are selected (that is, if the restriction on the maximum numbers of PDCCH candidate groups and CCEs is satisfied even after all the search spaces configured to be the common search space are selected), the UE (or base station) may select the search space sets configured to be the UE-specific search space. If there are multiple search space sets configured to be the UE-specific search spaces, a search space set having a low search space set index may have a higher priority. In consideration of priority, UE-specific search space sets may be selected within a range that satisfies the restriction on the maximum numbers of PDCCH candidate groups and/or CCEs.

[Operation 5] Selecting some PDCCHs in search space set.

If PDCCH repetitive transmission is performed within a specific search space set, when the UE determines whether to select the search space set in consideration of the PDCCH repetitive transmission, if the search space set is not selected in the existing way, the UE may select only some PDCCH transmissions of the PDCCH repetitive transmissions within a range that satisfies restriction on the maximum numbers of PDCCH candidate groups and/or CCEs and may not select the remaining PDCCH repetitive transmissions. In this case, criteria of selecting some of the PDCCH repetitive transmissions may be to preferentially select from repetitive transmissions to which different TCI states have been applied, or to preferentially select from repetitive transmissions performed in different control resource sets.

Items that may be considered as a condition capable of performing an overbooking scheme by applying the new criteria may be a combination of at least one of [condition 1] to [condition 4] of the second embodiment.

According to the embodiments of the disclosure, as downlink control information is repeated, the maximum number of blind decoding times and maximum number of CCEs that the UE may consider may be determined. As an example, the UE may receive different candidates of a downlink control channel by using a soft combining scheme, and in this case, the UE may bundle PDCCH candidates available for soft combining and may perform counting as 1 blind decoding. As another example, the UE may receive different PDCCH candidates of the downlink control channel by using an optional decoding scheme, in which case, if the UE is explicitly indicated with connection information on PDCCH candidates available for optional decoding, the UE may count 1 blind decoding time for the corresponding PDCCH candidates, and if the connection information for the PDCCH candidates available for optional decoding is implicitly indicated or not known, the UE may count the number of individual blind decoding times for the corresponding PDCCH candidates. In addition to reception schemes, such as soft combining or optional decoding, the embodiments of the disclosure may present restrictions and counting schemes for the maximum number of blind decoding times and the maximum number of CCEs in various ways according to resource use scheme of repetitive transmission/reception, beam configuration used for repetitive transmission/reception, search space and control resource region configurations, aggregation levels, etc.

Figure 19:
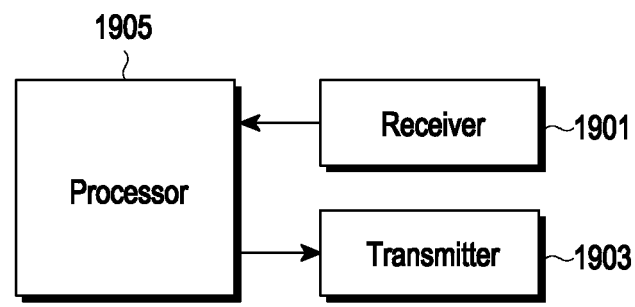
FIG. 19 is a diagram illustrating a structure of a UE in the wireless communication system according to an embodiment of the disclosure.

FIG. 19 is a diagram illustrating a structure of a UE in the wireless communication system according to an embodiment of the disclosure.

Referring to FIG. 19, a UE may include a transceiver which includes a receiver 1901 and a transmitter 1903, a memory (not shown), and a processor 1905. The processor 1905 may be at least one processor, and may be referred to as a controller or a control unit. The processor 1905 may control the overall device of the UE so that the UE operates according to each of the aforementioned embodiments as well as a combination of at least one embodiment of the disclosure. However, the elements of the UE are not limited to the aforementioned examples. For example, the UE may include more or fewer elements compared to the aforementioned elements. In addition, the transceiver, the memory, and the processor may be implemented in the form of at least one chip.

The transceiver may transmit a signal to or receive a signal from a base station. Here, the signal may include control information and data. To this end, the transceiver may include an RF transmitter configured to perform up-conversion and amplification of a frequency of a transmitted signal, an RF receiver configured to perform low-noise amplification of a received signal and down-converting a frequency of the received signal, and the like. However, this is only an embodiment of the transceiver, and the elements of the transceiver are not limited to the RF transmitter and the RF receiver.

The transceiver may receive a signal via a radio channel, may output the signal to the processor 1905, and may transmit the signal output from the processor 1905, via the radio channel.

The memory may store a program and data necessary for operation of the UE. The memory may store control information or data included in a signal transmitted or received by the UE. The memory may include a storage medium or a combination of storage media, such as ROM, RAM, hard disk, CD-ROM, and DVD. There may be multiple memories.

The processor 1905 may control a series of procedures so that the UE may operate according to each of the aforementioned embodiments as well as a combination of two or more embodiments. For example, the processor 1905 may control operation of the UE to receive PDCCH repetitive transmission, by applying at least one of the aforementioned multiple TRP-based PDCCH repetitive transmission method, restrictions on the maximum numbers of PDCCH candidate groups and CCEs according to the PDCCH repetitive transmission method, and overbooking method according to the PDCCH repetitive transmission method. There may be multiple processors 1905, and the processor 1905 may control the element(s) of the UE by executing a program stored in the memory.

Figure 20:
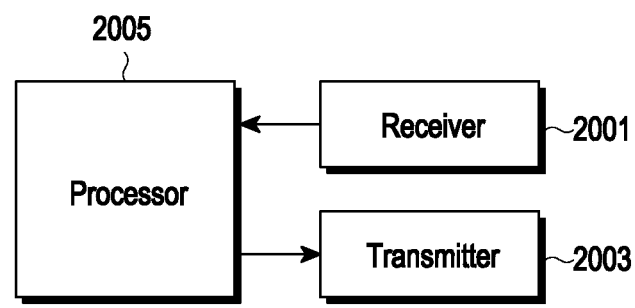
FIG. 20 is a diagram illustrating a structure of a base station in the wireless communication system according to an embodiment of the disclosure.

FIG. 20 is a diagram illustrating a structure of a base station in the wireless communication system according to an embodiment of the disclosure.

Referring to FIG. 20, a base station may include a transceiver which includes a receiver 2001 and a transmitter 2003, a memory (not shown), and a processor 2005. The base station may include a communication interface (not shown) for wired or wireless communication with another base station via a backhaul link. The processor 2005 may be at least one processor, and may be referred to as a controller or a control unit. The processor 2005 may control the overall device of the base station so that the base station operates according to each of the aforementioned embodiments as well as a combination of at least one embodiment of the disclosure. However, the elements of the base station are not limited to the above examples. For example, the base station may include more or fewer elements compared to the aforementioned elements. In addition, the transceiver, the memory, and the processor may be implemented in the form of at least one chip.

The transceiver may transmit a signal to or receive a signal from a UE. Here, the signal may include control information and data. To this end, the transceiver may include an RF transmitter configured to perform up-conversion and amplification of a frequency of a transmitted signal, an RF receiver configured to perform low-noise amplification of a received signal and down-converting a frequency of the received signal, and the like. However, this is only an embodiment of the transceiver, and the elements of the transceiver are not limited to the RF transmitter and the RF receiver.

The transceiver may receive a signal via a radio channel, may output the signal to the processor 2005, and may transmit the signal output from the processor 2005, via the radio channel.

The memory may store a program and data necessary for operation of the base station. The memory may store control information or data included in a signal transmitted or received by the base station. The memory may include a storage medium or a combination of storage media, such as ROM, RAM, hard disk, CD-ROM, and DVD. There may be multiple memories.

The processor 2005 may control a series of procedures so that the base station may operate according to the aforementioned embodiment of the disclosure. For example, the processor 2005 may control each element of the base station to perform PDCCH repetitive transmission, by applying at least one of the aforementioned multiple TRP-based PDCCH repetitive transmission method, restriction on the maximum numbers of PDCCH candidate groups and CCEs according to the PDCCH repetitive transmission method, and overbooking method according to the PDCCH repetitive transmission method. There may be multiple processors 2005, and the processor 2005 may control the element(s) of the base station by executing a program stored in the memory.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, one embodiment of the disclosure may be partially combined with other embodiments to operate a base station and a UE. As an example, embodiment 1 and 2 of the disclosure may be combined with each other to operate a base station and a UE. Further, although the above embodiments have been described on the basis of the FDD LTE system, other variants based on the technical idea of the embodiments may also be implemented in other communication systems such as TDD LTE, 5G, or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   transmitting, to a base station, first information related to multiple transmission-reception-points (TRPs) based physical downlink control channel (PDCCH) repetition, the first information including second information indicating a number of blind decoding for PDCCH candidates;
   receiving, from the base station, third information on a control resource set and fourth information on a search space; and
   monitoring PDCCH candidates based on a span, the second information, and the third and fourth information, the span being a number of consecutive symbols in a slot where the UE is configured to monitor a PDCCH,
   wherein the second information indicates a UE capability for counting two PDCCH candidates as two PDCCH candidates or as three PDCCH candidates, the UE capability being related to the number of blind decoding for the multiple TRPs based PDCCH repetition.

2. The method of claim 1, wherein the number of the blind decoding for the PDCCH candidates corresponds to a number of PDCCH candidate groups.

3. The method of claim 1, wherein the second information indicates that the number of the blind decoding for the two PDCCH candidates is counted as the two PDCCH candidates or as the three PDCCH candidates.

4. The method of claim 1, wherein the PDCCH repetition is based on the two PDCCH candidates.

5. A user equipment (UE) in a wireless communication system, the UE comprising:
   a transceiver; and
   a processor configured to:
      transmit, to a base station via the transceiver, first information related to multiple transmission-reception-points (TRPs) based physical downlink control channel (PDCCH) repetition, the first information including second information indicating a number of blind decoding for PDCCH candidates,
      receive, via the transceiver from the base station, third information on a control resource set and fourth information on a search space, and
      monitor PDCCH candidates based on a span, the second information, and the third and fourth information, the span being a number of consecutive symbols in a slot where the UE is configured to monitor a PDCCH,
   wherein the second information indicates UE capability for counting two PDCCH candidates as two PDCCH candidates or as three PDCCH candidates, the UE capability being related to the number of blind decoding for the multiple TRPs based PDCCH repetition.

6. The UE of claim 5, wherein the number of the blind decoding for the PDCCH candidates corresponds to a number of PDCCH candidate groups.

7. The UE of claim 5, wherein the second information indicates that the number of the blind decoding for the two PDCCH candidates is counted as the two PDCCH candidates or as the three PDCCH candidates.

8. The UE of claim 5, wherein the PDCCH repetition is based on the two PDCCH candidates.

9. A method performed by a base station in a wireless communication system, the method comprising:
  receiving, from a user equipment (UE), first information related to multiple transmission-reception-points (TRPs) based physical downlink control channel (PDCCH) repetition, the first information including second information indicating a number of blind decoding for PDCCH candidates;
  transmitting third information on a control resource set and fourth information on a search space; and
  transmitting downlink control information on PDCCH candidates based on a span, the second information, and the third and fourth information, the span being a number of consecutive symbols in a slot where the UE is configured to monitor a PDCCH,
  wherein the second information indicates UE capability for counting two PDCCH candidates as two PDCCH candidates or as three PDCCH candidates, the UE capability being related to the number of blind decoding for the multiple TRPs based PDCCH repetition.

10. The method of claim 9, wherein the number of the blind decoding for the PDCCH candidates corresponds to a number of PDCCH candidate groups.

11. The method of claim 9, wherein the second information indicates that the number of the blind decoding for the two PDCCH candidates is counted as the two PDCCH candidates or as the three PDCCH candidates.

12. The method of claim 9, wherein the PDCCH repetition is based on the two PDCCH candidates.

13. A base station in a wireless communication system, the base station comprising:
  a transceiver; and
  a processor configured to:
    receive, via the transceiver from a user equipment (UE), first information related to multiple transmission-reception-points (TRPs) based physical downlink control channel (PDCCH) repetition, the first information including second information indicating a number of blind decoding for PDCCH candidates,
    transmit third information on a control resource set and fourth information on a search space, and
    transmit downlink control information on PDCCH candidates based on a span, the second information, and the third and fourth information, the span being a number of consecutive symbols in a slot where the UE is configured to monitor a PDCCH,
  wherein the second information indicates a UE capability counting for two PDCCH candidates as two PDCCH candidates or as three PDCCH candidates, the UE capability being related to the number of blind decoding for the multiple TRPs based PDCCH repetition.

14. The base station of claim 13, wherein the number of the blind decoding for the PDCCH candidates corresponds to a number of PDCCH candidate groups.

15. The base station of claim 13, wherein the second information indicates that the number of the blind decoding for the two PDCCH candidates is counted as the two PDCCH candidates or as the three PDCCH candidates.

16. The base station of claim 13, wherein the PDCCH repetition is based on the two PDCCH candidates.

* * * * *